United States Patent
Cheon

(10) Patent No.: US 12,529,513 B2
(45) Date of Patent: Jan. 20, 2026

(54) REFRIGERATOR WITH DOOR LIGHTING PANEL ASSEMBLY

(71) Applicant: LG Electronics Inc., Seoul (KR)

(72) Inventor: Sanghyun Cheon, Seoul (KR)

(73) Assignee: LG Electronics Inc., Seoul (KR)

( * ) Notice: Subject to any disclaimer, the term of this patent is extended or adjusted under 35 U.S.C. 154(b) by 196 days.

(21) Appl. No.: 18/373,618

(22) Filed: Sep. 27, 2023

(65) Prior Publication Data

US 2024/0133619 A1 Apr. 25, 2024
US 2024/0230213 A9 Jul. 11, 2024

(30) Foreign Application Priority Data

Oct. 19, 2022 (KR) .................. 10-2022-0134753

(51) Int. Cl.
| | |
|---|---|
| *F25D 27/00* | (2006.01) |
| *F21V 19/00* | (2006.01) |
| *F25D 23/02* | (2006.01) |
| *F21W 131/305* | (2006.01) |
| *F21Y 105/16* | (2016.01) |
| *F21Y 115/10* | (2016.01) |

(52) U.S. Cl.
CPC .......... *F25D 27/00* (2013.01); *F21V 19/0035* (2013.01); *F25D 23/028* (2013.01); *F21W 2131/305* (2013.01); *F21Y 2105/16* (2016.08); *F21Y 2115/10* (2016.08)

(58) Field of Classification Search
CPC .... F25D 27/00; F25D 23/028; F25D 2400/36; F25D 2400/361; F21Y 2105/16
See application file for complete search history.

(56) References Cited

U.S. PATENT DOCUMENTS 8,789,900 B2  7/2014  Laible et al.
11,047,614 B2 *  6/2021  Kim ..................... G02B 6/0073
(Continued)

FOREIGN PATENT DOCUMENTS

CN  103250018  3/2016
EP  4310424  1/2024
(Continued)

OTHER PUBLICATIONS

Mashimo, Refrigerator, 2014, WO2014208585A1, https://worldwide.espacenet.com/patent/search/family/052141917/publication/WO2014208585A1?q=pn%3DWO2014208585A1 (Year: 2014).*
(Continued)

*Primary Examiner* — Tracie Y Green
*Assistant Examiner* — Michael Chiang
(74) *Attorney, Agent, or Firm* — Fish & Richardson P.C.

(57) ABSTRACT

The present disclosure relates to a refrigerator, and the refrigerator includes a cabinet having a storage space; and a door including a door body configured to open and close the storage space and a panel assembly detachably mounted to the door body, in which the panel assembly includes: a panel which is configured to define an outer appearance of a front surface of the door and through which light is transmitted; a lighting device provided behind the panel and shining the panel; and a back cover defining a rear surface of the panel assembly and shielding the lighting device from the rear side; and the lighting device is disposed to face the panel and radiates light toward the panel.

15 Claims, 16 Drawing Sheets

(56) References Cited

U.S. PATENT DOCUMENTS

| | | | | |
|---|---|---|---|---|
| 2010/0313592 | A1* | 12/2010 | Pae | F25D 23/02 |
| | | | | 62/449 |
| 2021/0199367 | A1* | 7/2021 | Kim | E06B 3/66304 |
| 2021/0373717 | A1* | 12/2021 | McClure | F25D 29/005 |
| 2022/0082237 | A1* | 3/2022 | Casanova | H05K 1/026 |
| 2024/0027124 | A1* | 1/2024 | Kim | F25D 27/00 |

FOREIGN PATENT DOCUMENTS

| | | | | |
|---|---|---|---|---|
| KR | 10-1713333 | | 3/2017 | |
| WO | WO 2014/030526 | | 2/2014 | |
| WO | WO 2014/208585 | | 12/2014 | |
| WO | WO-2014208585 | A1 * | 12/2014 | H01H 36/00 |

OTHER PUBLICATIONS

Extended European Search Report in European Appln. No. 23200507.4, mailed on Mar. 6, 2024, 10 pages.

* cited by examiner

REFRIGERATOR WITH DOOR LIGHTING PANEL ASSEMBLY

CROSS-REFERENCE TO RELATED APPLICATIONS

The present application claims priority under 35 U.S.C. 119 and 35 U.S.C. 365 to Korean Patent Application No. 10-2022-0134753, filed on Oct. 19, 2022, which is hereby incorporated by reference in its entirety.

BACKGROUND

The present disclosure relates to a refrigerator.

In general, home appliances are disposed in an indoor space and may be disposed to be harmonized with the surrounding space. In addition, to further improve the outer appearance of the home appliance, a panel defining an outer appearance on a front surface of the home appliance may be provided.

Typically, structures that variously modify the outer appearance of the front surface of the refrigerator so as to be harmonized with environments in which the refrigerator is placed, surrounding furniture, or other home appliances are being developed, and this trend is being made throughout the home appliances.

U.S. Patent Application No. 8789900 discloses a structure in which a decoration panel defining an outer appearance is installed on a door front of a refrigerator, and here, the outer appearance of the door front is defined according to a user's preference by detachably configuring the decoration panel.

However, the refrigerator having this structure has a problem in that, when a user wants to change the outer appearance, the entire decoration panel needs to be removed and replaced, and it is not possible to use the decoration panel before replacement any longer.

To solve this limitation, Chinese Patent Application No. 103250018 discloses a refrigerator in which a reflective layer and a transparent panel are disposed on a door front and colored light emitting members are mounted on both side ends of the reflective layer to cause the transparent panel to shine with set color.

However, in such a structure, there is a problem that the entire front surface of the door may not uniformly shine, and both ends where the light emitting members are disposed become dark, or the brightness is relatively dark in a portion located far from the light emitting member, resulting in poor outer appearance quality.

SUMMARY

An object of an embodiment of the present disclosure is to provide a refrigerator in which the entire panel forming the front surface of the door can shine in a color set by a user.

An object of an embodiment of the present disclosure is to provide a refrigerator in which the entire front surface of the door shines with uniform brightness and color.

An object of an embodiment of the present disclosure is to provide a refrigerator in which damage to a lighting device is prevented even when a door is repeatedly impacted at the time of opening and closing of the door.

A refrigerator according to an embodiment of the present disclosure includes a cabinet having a storage space; and a door including a door body configured to open and close the storage space and a panel assembly detachably mounted to the door body, in which the panel assembly may include a panel which is configured to define an outer appearance of a front surface of the door and through which light is transmitted; a lighting device provided behind the panel and shining the panel; and a back cover defining a rear surface of the panel assembly and shielding the lighting device from the rear side; and the lighting device may be disposed to face the panel and may radiate light toward the panel.

The lighting device may include a substrate formed in a plate shape and disposed side by side with the panel; and a plurality of LEDs disposed on the substrate at equal intervals in vertical and horizontal directions and radiating light toward the front surface of the panel.

The panel assembly may further include mounting members formed in a plate shape through which light is transmitted, partitioning between the panel and the lighting device, and mounting the panel and the lighting device at front and rear sides.

The refrigerator may include a spacer provided between the mounting member and the lighting member and allowing the lighting member to maintain predetermined intervals from the mounting member.

The spacer may be formed in a plate shape capable of transmitting light, and the front surface of the spacer may be in contact with the rear surface of the mounting member, and the rear surface of the spacer may be in contact with the front surface of the substrate.

The spacer may have through-holes formed at positions corresponding to the plurality of LEDs to receive the LEDs therein.

The thickness of the spacer may be formed thicker than the height of the LED protruding from the substrate.

The open rear surface of the through-hole may be formed larger than the size of the LED, and the open front surface of the through-hole may be larger than the size of the open rear surface of the through-hole.

The through-hole may be formed such that a circumference of the through-hole is located in an area outside the irradiation angle of the LED.

The spacer may include a first support portion supported on the substrate and extending perpendicularly to the substrate; an inclined portion inclined in a direction away from the center of the LED as it extends upward from an end portion of the first support portion; and a second support portion extending upward from the upper end of the inclined portion and in contact with the mounting member, and an inner surface of the through-hole may be formed by the first support portion, the inclined portion, and the second support portion.

A contact area between the first support portion and the substrate may be larger than a contact area between the second support portion and the mounting member.

The mounting member may include a front surface portion forming a front surface and to which the panel is mounted; a side surface portion bent backward from both left and right ends of the front portion; and a rear surface portion bent from the side surface portion toward the center of the mounting member, in which the accommodation portion may be formed by the front surface portion, the side surface portion, and the rear surface portion, and both ends of the substrate and the spacer may be inserted into the accommodation portion while being in contact with each other.

The spacer may include a spacer body formed in a plate shape and in contact with the substrate; and a transmission portion recessed in the spacer body and accommodating an LED therein, and in which the transmission portion may be formed to transmit the light of the LED.

The transmission portion may be formed in a forward convex lens shape, and the protruding central portion of the transmission portion and the central portion of the LED may be located on the same extension line.

The spacer may be formed of a material capable of transmitting light and is disposed at a position corresponding to the plurality of LEDs on the front surface of the substrate, and the spacer may be formed with a recessed LED accommodation portion to accommodate the LED.

The spacer may include an edge portion having open front and back surfaces, and formed with an LED accommodation portion therein; and a transmission portion for shielding the open front surface of the edge portion, and in which the transmission portion may be formed in a lens shape in which a central portion protrudes.

The substrate may be mounted on the mounting member in a state of being coupled to the spacer, and both left and right ends of the substrate may be fixed by the mounting portion, and the protruding end portion of the spacer may be in contact with the front surface portion of the mounting member.

The lighting device may include a base formed in a plate shape parallel to the rear surface of the panel and composed of at least one film layer; and a plurality of LEDs disposed on the base at equal intervals and radiating light toward the panel.

The base may include a first layer in which a plurality of the LEDs are disposed; and a second layer disposed on the front surface of the first layer and shielding all of the plurality of LEDs, and in which the second layer may be formed of a material capable of transmitting light.

The back cover may be formed of a metal material, and an insulator for shielding the lighting device may be provided between the back cover and the lighting device.

The refrigerator according to the proposed embodiment can expect the following effects.

In the refrigerator according to an embodiment of the present disclosure, a lighting device is provided behind the panel, and a plurality of LEDs constituting the lighting device irradiate light of a set color toward the panel and thus there is an advantage of changing the color of the front surface of the panel in various ways.

In particular, the plurality of LEDs are evenly distributed in the rear area of the panel, and all the LEDs irradiate light toward the rear surface of the panel so that the entire panel can shine in a desired color. Therefore, there is an advantage in that the outer appearance of the front surface of the door, that is, the color of the entire outer appearance of refrigerators and home appliances can be changed.

At this time, the plurality of LEDs can maintain set intervals from the panel by spacers and thus there is an advantage in that the entire front surface of the panel shines with uniform brightness by uniformly irradiating light to the entire panel without generating light formation on the panel.

In addition, even if an impact occurs during opening and closing of the door, the LEDs can maintain set intervals by means of the spacer, and thus there is an advantage of preventing damage to the LEDs and maintaining a uniform light irradiation state through the LEDs. In addition, there is an advantage of preventing scratches and damage on the surface of the mounting member or panel by preventing an impact between the LED and the mounting member or panel.

In addition, there is an advantage in that light passing through the spacer can be refracted and reflected to be evenly irradiated to the entire panel, and thus the entire front surface of the panel may shine with more uniform brightness.

In addition, as the plurality of LEDs irradiate light toward the rear surface of the panel, it is possible to output the screen to the panel in the form of a picture, text, image, video, or the like through a combination of the plurality of LEDs. Therefore, it is possible to configure the outer appearance in a form desired by the user, and there is an advantage in that various information can be provided through the screen output of the panel.

In addition, an insulator may be provided between the lighting member and the back cover, and even if the back cover made of metal is disposed adjacent to the lighting device by the insulator, it is possible to prevent static electricity generated during use of the door from being conducted to the lighting device.

DETAILED DESCRIPTION OF THE EMBODIMENTS

Hereinafter, detailed embodiments will be described in detail with reference to the accompanying drawings. However, the present disclosure is limited to the embodiments in which the spirit of the present invention is proposed, and other degenerate idea or other embodiments included in the scope of the present invention may be easily proposed by addition, changes, deletions, or the like of other elements.

Prior to a description, directions are defined. In an embodiment of the present disclosure, a direction toward a door is defined as a front direction with respect to a cabinet illustrated in FIG. 2, a direction toward the cabinet with respect to the door is defined as a rear direction, a direction toward a bottom on which a refrigerator is installed is defined as a downward direction, and a direction away from the bottom is defined as an upward direction.

Figure 1:
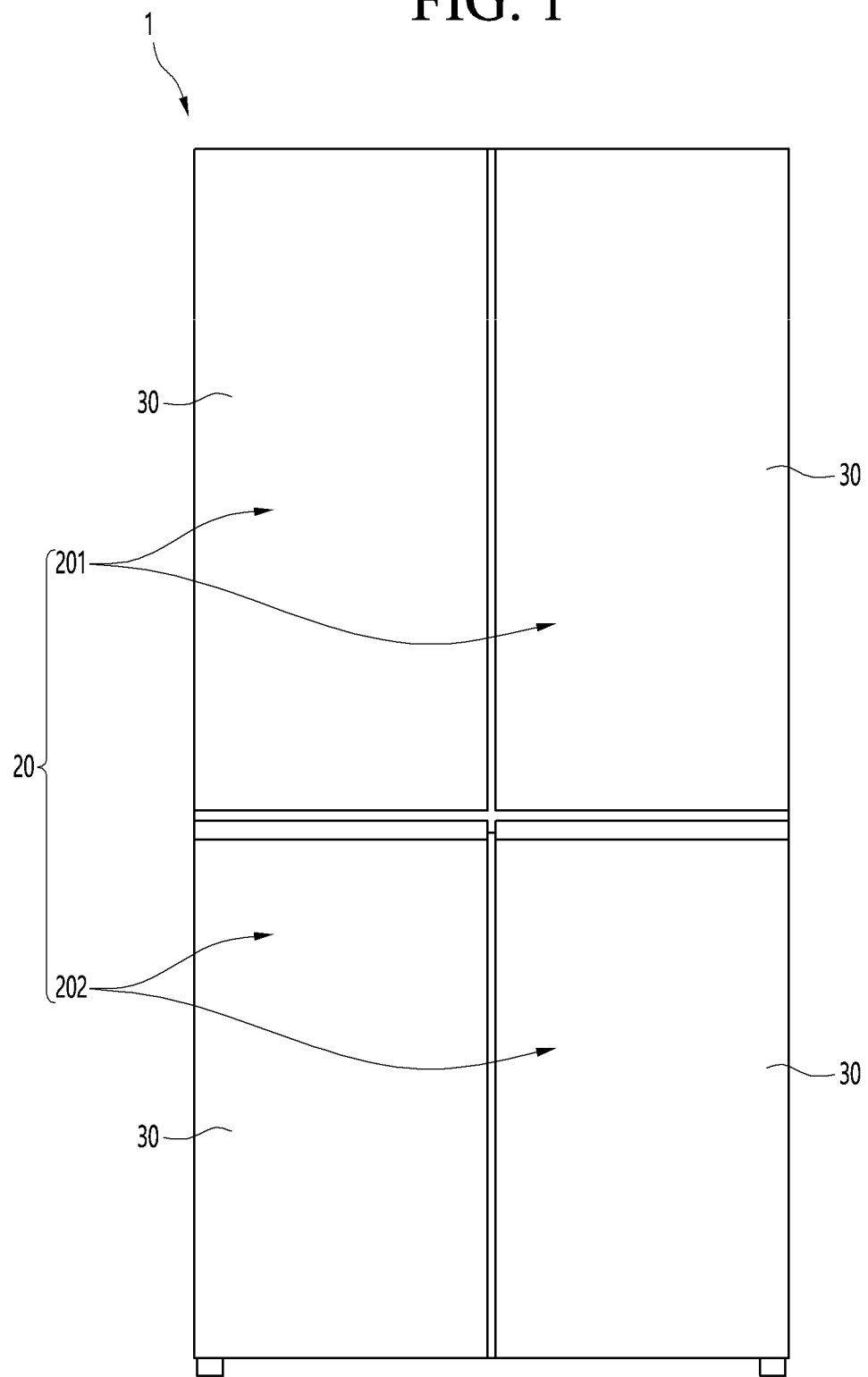
FIG. 1 is a front view of a refrigerator according to a first embodiment.
Figure 2:
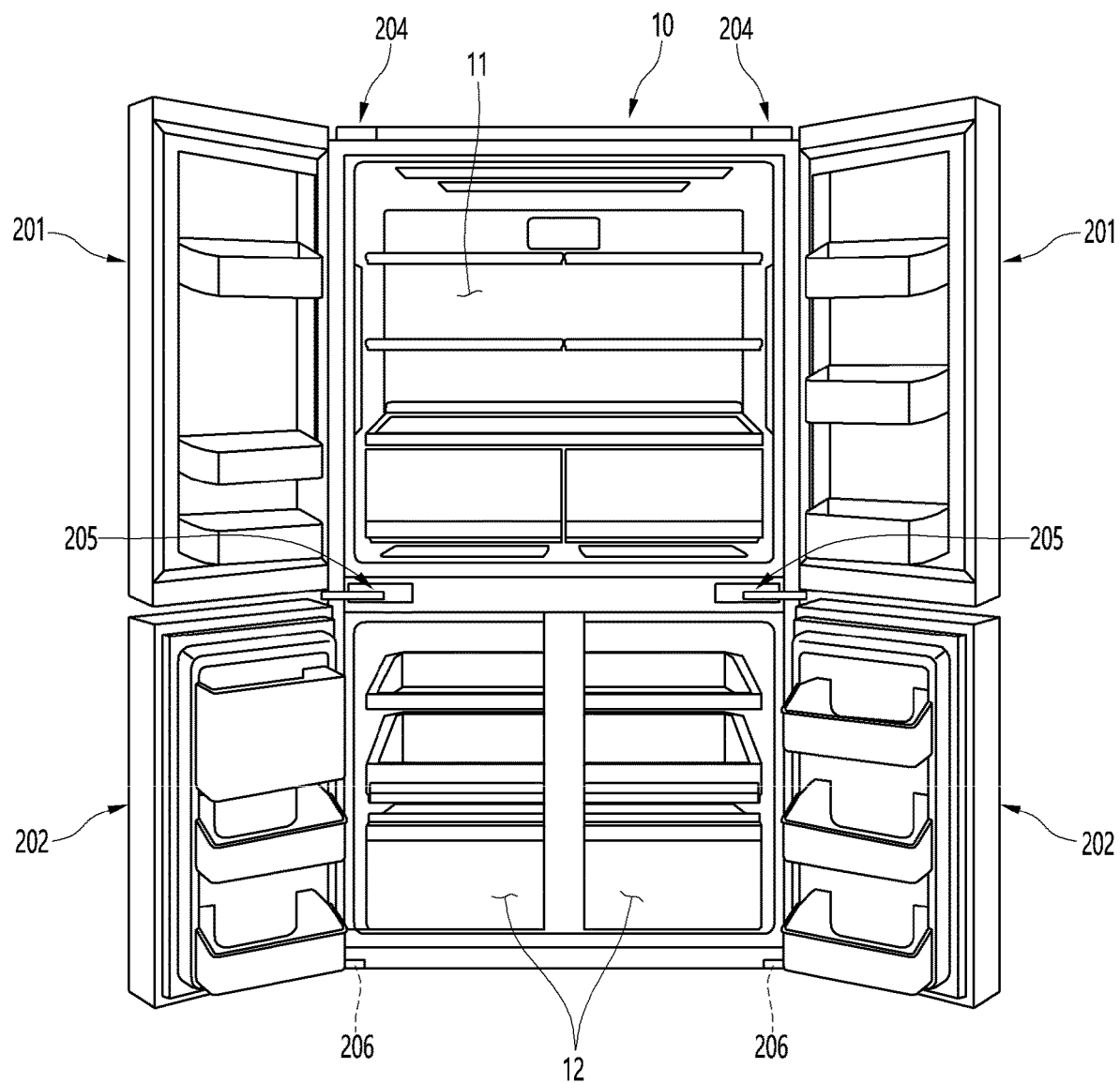
FIG. 2 is a front view illustrating a state in which a door of the refrigerator is opened.

FIG. 1 is a front view of a refrigerator according to a first embodiment. In addition, FIG. 2 is a front view illustrating a state in which a door of the refrigerator is opened.

As illustrated in the drawings, an outer appearance of a refrigerator 1 according to an embodiment may be defined by a cabinet 10 in which a storage space is defined, and a door 20 for opening and closing the storage space of the cabinet 10.

For example, the cabinet 10 may define the storage space partitioned in a vertical direction. Here, a refrigerating compartment 11 may be defined at an upper portion of the cabinet 10, and a freezing compartment 12 may be defined at a lower portion of the cabinet 10. The refrigerating compartment 11 may be referred to as an upper storage space, and the freezing compartment 12 may be referred to as a lower storage space.

The door 20 may be configured to open and close each of the refrigerating compartment 11 and the freezing compartment 12. The door 20 may include a refrigerating compartment door 201 opening and closing the refrigerating compartment 11 and a freezing compartment door 202 opening and closing the freezing compartment 12. In addition, a pair of refrigerating compartment doors 201 may be disposed side by side on both left and right sides, and each refrigerating compartment door 201 may partially open and close the refrigerating compartment 11. In addition, a pair of freezing compartment doors 202 may be disposed side by side on both left and right sides, and may open and close the freezing compartment 12 divided into left and right sides, respectively. Since the refrigerating compartment door 201 is provided at the upper portion of the cabinet 10, the refrigerating compartment door may be referred to as an upper door, and since the freezing compartment door 202 is provided at the lower portion of the cabinet 10, the freezing compartment door may be referred to as a lower door.

The door 20 may be rotatably mounted on the cabinet 10 by being connected by hinge devices 204, 205, and 206 and may open and close the refrigerating compartment 11 and the freezing compartment 12 by rotation, respectively.

In the present embodiment, although the refrigerator having a structure in which a refrigerating compartment 11 is disposed at an upper side, and a freezing compartment 12 is disposed at a lower side is described as an example in the embodiment, the present disclosure may be applied to all types of refrigerators equipped with a door without being limited to types of refrigerators.

Meanwhile, an outer appearance of the front surface of the refrigerator 1 may be defined in the state in which the door 20 is closed and may define the out appearance of the refrigerator 1 viewed from the front in the state in which the refrigerator 1 is installed.

The door 20 may have a structure in which a front surface selectively emits light and may be configured to shine with set color or brightness. Thus, a user may manipulate the refrigerator 1 so that the front surface of the refrigerator 1 is changed in color or brightness of the door 20 without separating or disassembling the door 20 and may change the overall outer appearance of the refrigerator 1.

Hereinafter, the structure of the door 20 will be described in detail with reference to drawings. In addition, in the embodiment of the present disclosure, the refrigerator compartment door 201 will be described as a reference, and other doors may also have the same structure with a difference only in the mounting position.

Figure 3:
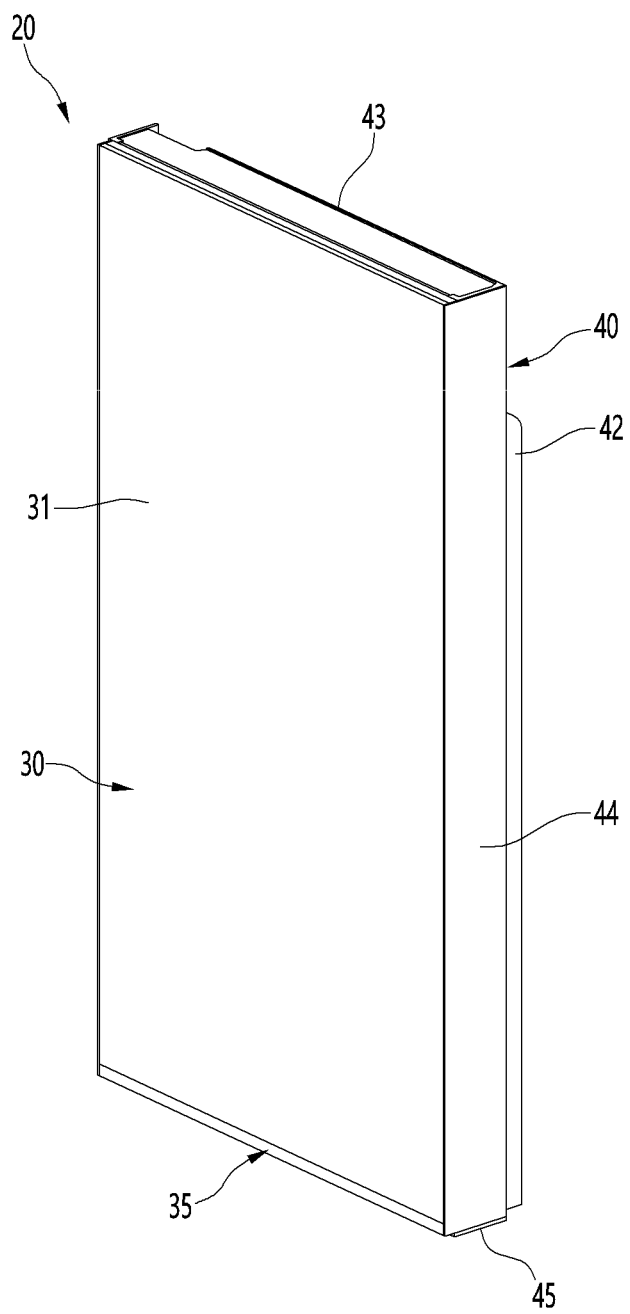
FIG. 3 is a perspective view of the door.
Figure 4:
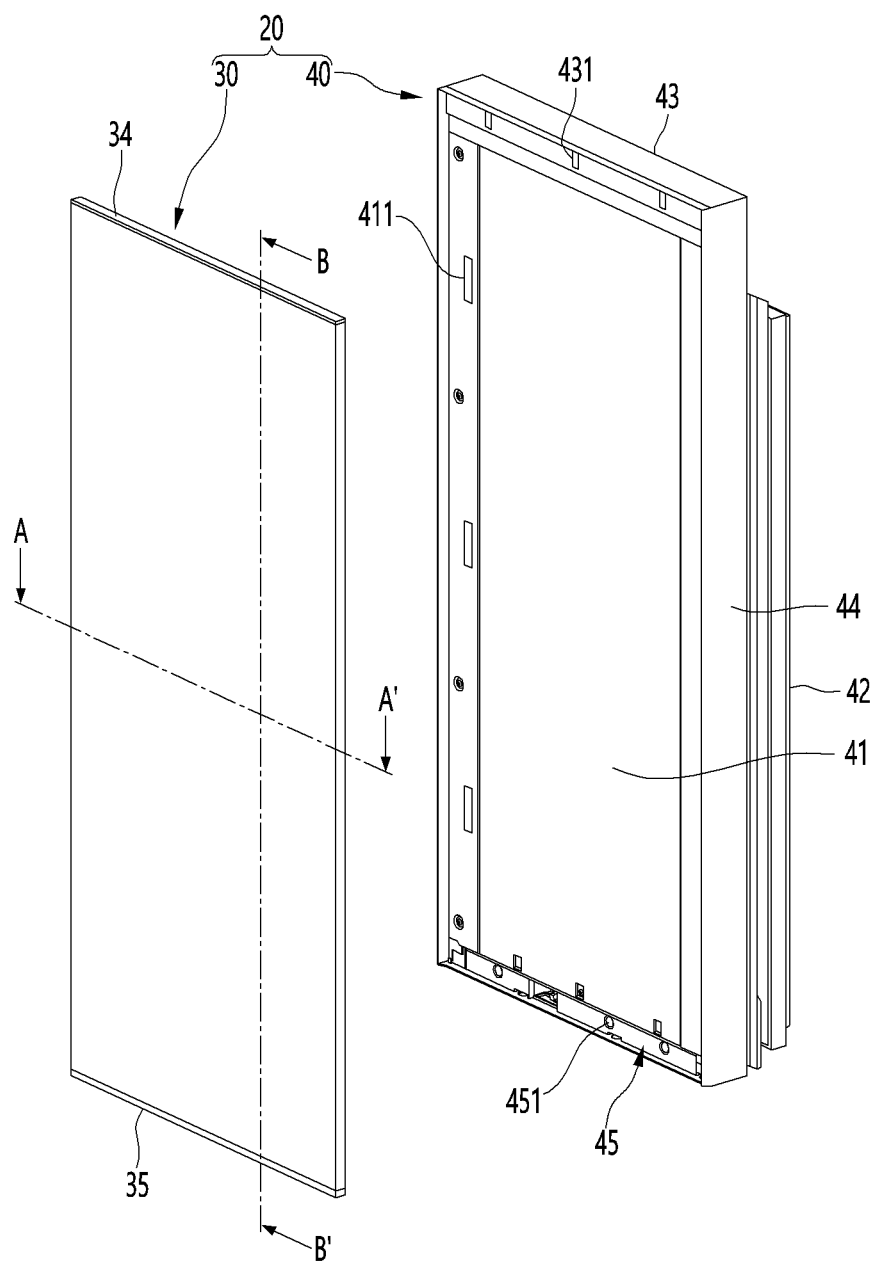
FIG. 4 is an exploded perspective view illustrating a state in which a panel assembly and a door body, which are the main components of the door, are separated.

FIG. 3 is a perspective view of the door, and FIG. 4 is an exploded perspective view illustrating a state in which a panel assembly and a door body, which are the main components of the door, are separated.

As illustrated in the drawings, the door 20 may include a door body 21 defining the overall shape of the door 20 and configured to open and close the storage space and a panel assembly 30 defining an outer appearance of a front surface of the door 20.

The door body 40 may include a body plate 41 forming a front surface and a door liner 42 forming a rear surface. In addition, the door body 40 may include side decorations 44 forming both left and right sides of the door body 21. The side decoration 44 may extend vertically, and the upper end may be combined with the upper cap decoration 43 and the lower end may be combined with the lower cap decoration 45. In addition, the door body 40 may further include an upper cap decoration 43 and a lower cap decoration 45 forming top and bottom surfaces of the door body 40.

That is, the outer appearance of the door body 40 may be formed by the body plate 41, the door liner 42, the side decoration 44, the upper cap decoration 43, and the lower cap decoration 45. In addition, The insulator 400 may be filled in the space inside the door body 40 defined by combining the body plate 41, the door liner 42, the side decoration 44, the upper cap decoration 43, and the lower cap decoration 45.

In addition, a structure for mounting the panel assembly 30 may be provided on the front surface of the door body 40. In detail, an upper mounting portion 431 into which an upper protrusion 343 protruding from the rear surface of the panel assembly 30 is inserted may be formed on the front surface of the upper cap decoration 43. In addition, a lower mounting portion 451 into which a lower protrusion 353 protruding from the rear surface of the panel assembly 30 is inserted may be formed on the front surface of the lower cap decoration 45. In addition, a fixture 411 into which fixing members 37 protruding rearward from both left and right sides of the rear surface of the panel assembly 30 are inserted may be further formed on the front surface of the door body 40.

At least one of the upper protrusion 343, the lower protrusion 353, and the fixing member 37 may be provided, and the panel assembly 30 is detachable from the door body 40 in an assembled state.

The panel assembly 30 is formed in a plate shape, and may define the outer appearance of the front surface of the door 20 in a state of being mounted on the front surface of the door body 40. Since the panel assembly 30 forms the outer appearance of the front surface of the door 20, the panel assembly may be referred to as a door panel, and since the panel assembly forms the outer appearance of the front surface of the refrigerator 1, the panel assembly may also be referred to as an exterior panel.

As described above, the panel assembly 30 may be detachably mounted from the door body 40 for services and maintenance.

A front surface of the panel assembly 30 may be exposed forward in the state in which the panel assembly 30 is mounted on the door body 40, and the panel assembly 30 may substantially form the outer appearance of the front surface of the door 20. That is, a color of the outer appearance of the front surface of the door 20 may be determined by a color of the front surface of the panel assembly 30. In addition, the entire front surface of the panel assembly 30 may be configured to shine in a color specified by the user, and in the state in which the door 20 and the panel assembly 30 are mounted, various colors selected by the user may be changed to variously express the color of the front surface of the door 20. In addition, the panel assembly 30 may transmit information to the user in the form of a picture, text, image, or video through screen output.

Hereinafter, the structure of the panel assembly 30 will be described in detail with reference to drawings.

Figure 5:
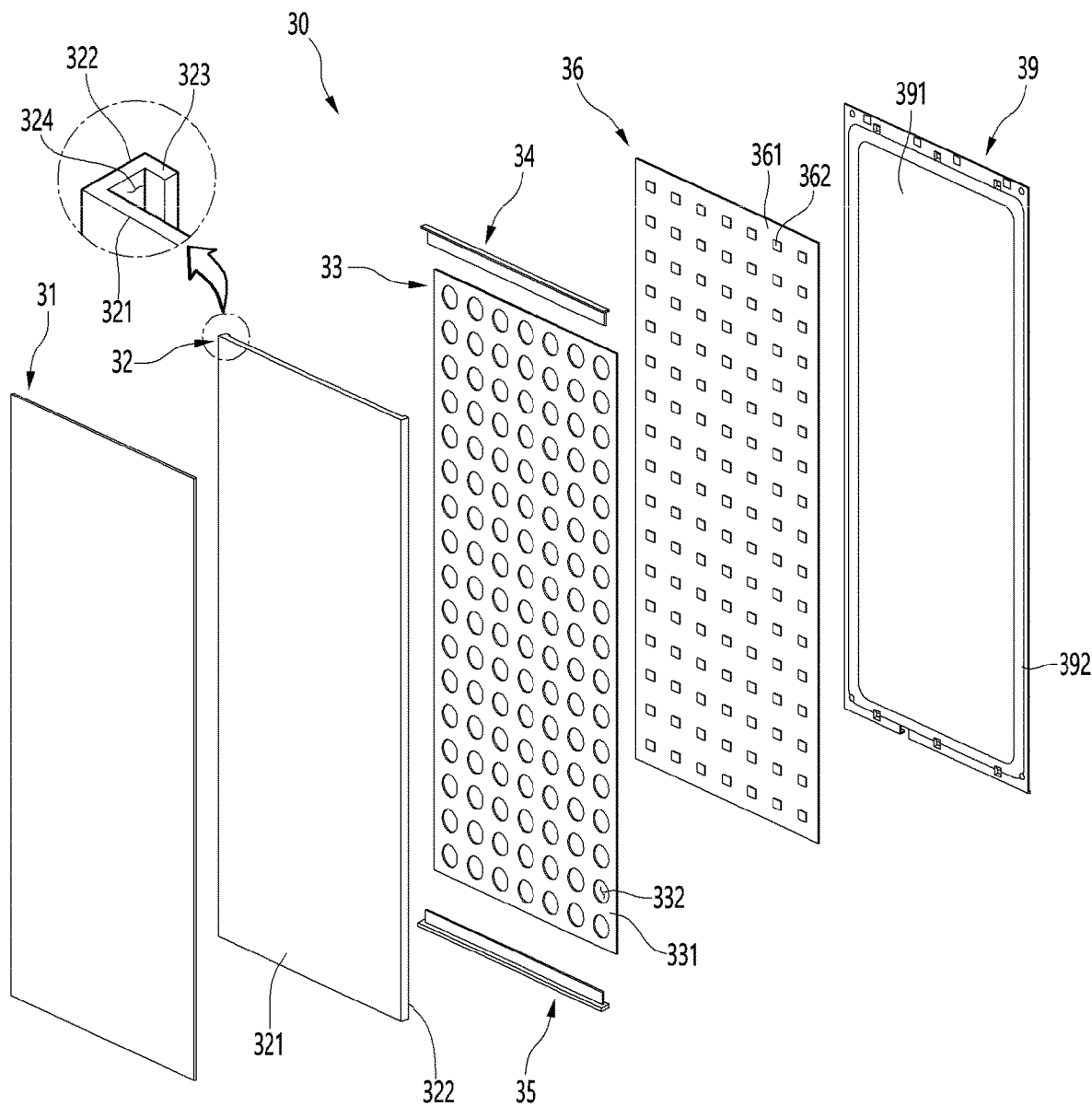
FIG. 5 is an exploded perspective view of the panel assembly.
Figure 6:
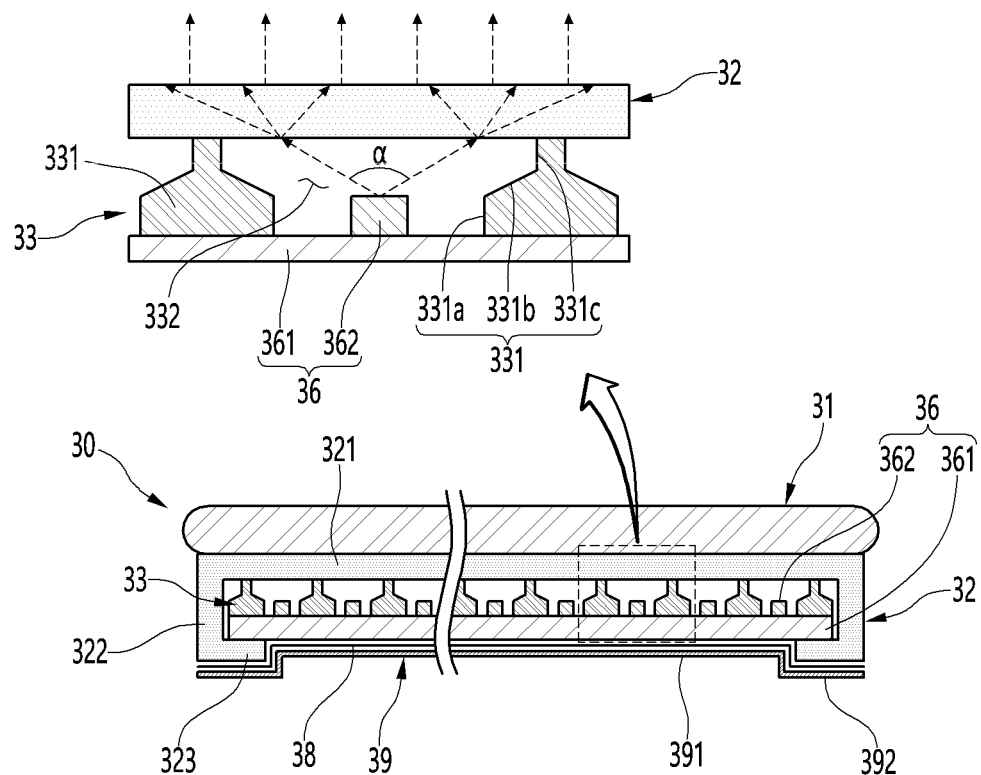
FIG. 6 is a cross-sectional view of the panel assembly.

FIG. 5 is an exploded perspective view of the panel assembly, and FIG. 6 is a cross-sectional view of the panel assembly.

As illustrated in the drawing, the panel assembly 30 may include a panel 31 forming the outer appearance of the front surface, a lighting device 36 for radiating light so that the panel 31 shines, and a back cover 39 defining the outer appearance of the rear surface of the panel assembly 30.

In addition, the panel assembly 30 may further include a mounting member 32 for mounting the panel 31 and the lighting device 36. In addition, the panel assembly 30 may further include a spacer 33 provided between the mounting member 32 and the lighting device 36.

In addition, the panel assembly 30 may further include an upper bracket 34 defining a top surface of the panel assembly 30 and a lower bracket 35 defining a bottom surface of the panel assembly 30.

In more detail, the panel 31 may be provided in a rectangular plate shape and may be made of a transparent material that transmits light therethrough. For example the panel 31 may be made of a glass material such as blue glass, white glass, and vapor deposition glass or may be made of other materials for transmitting light therethrough, such as ABS, PMMA, or PC. In all embodiments of the present disclosure, the terms "transparent" and "transmission" may be defined as a state in which the light passes to display a set color through the panel 31.

In addition, the panel 31 may be formed to have a color. The panel 31 may be configured such that the light irradiated from the lighting device 36 provided at the rear of the panel 31 is transmitted, but components at the rear of the panel 31 are not shined.

A mounting member 32 may be provided between the panel 31 and the lighting device 36. The mounting member 32 may be configured such that the panel 31 and the lighting device 36 can be fixedly mounted. In addition, the mounting member 32 may be formed of a material capable of transmitting light. Therefore, the mounting member 32 may be referred to as a fixing member or a transmission member.

The mounting member 32 may include the plate-shaped front surface portion 321, the side surface portion 322 protruding rearward from both left and right ends of the front surface portion 321, and a rear surface portion 323 bent at the rear end of the side surface portion 322. The front surface portion 321 may be disposed between the panel 31 and the spacer 33, and may have a front surface in contact with the panel 31 and a rear surface in contact with the spacer 33. In addition, the side surface portion 322 and the rear surface portion 323 may provide a structure in which the spacer 33 and the lighting device 36 can be fixed. In addition, the side surface portion and the rear surface portion 323 may provide a structure in which the upper bracket 34, the lower bracket 35, and the back cover 39 can be mounted.

In detail, the front surface portion 321 may be formed in a plate shape having a size corresponding to that of the panel 31, and an adhesive may be applied around the front surface portion 321 to adhere the panel 31.

The side surface portion 322 may be defined along both left and right ends of the light guide plate 33, and a rear end of the side surface portion 322 may be bent to form the rear surface portion 323. In addition, the rear surface portion 323 deformed on the left and right side surface portions 322 may extend in directions facing each other.

Accordingly, the side surface portion 322 may be formed with an accommodation portion 324 into which both left and right ends of the lighting device 36 and the spacer 33 are inserted. That is, the accommodation portion 324 may be defined by the rear surface portion 323 spaced apart from the front surface portion 321 and the side surface portion 322 connecting the end portions of the front surface portion 321 and the rear surface portion 323. In addition, the top and bottom surfaces of the accommodation portion are opened so that the upper bracket 34 and the lower bracket 35 can be inserted and fixed from the upper and lower sides.

The upper and lower ends of the back cover 39 forming the rear surface of the panel assembly 30 are coupled to the upper bracket 34 and the lower bracket 35, and both left and right ends may be coupled to the rear portion 323. Accordingly, the rest of the components of the panel assembly 30 except for the panel 31 may be fixed by the coupling of the back cover 39.

The back cover 39 is formed in a plate shape of a metal material and may define a rear surface of the panel assembly 30. The back cover 39 may include a cover protrusion 391 at the center of the back cover 39 and a cover circumferential portion 392 defined along the circumference of the cover protrusion 391, and the cover protrusion 391 and the cover circumferential portion 392 may be formed by forming.

The cover protrusion 391 may support the rear surface of the lighting device 36. In addition, upper and lower ends of the cover circumferential portion 392 may be coupled to the upper bracket 34 and the lower bracket 34. For example, a screw may be fastened to the back cover 39 to be coupled to the upper bracket 34 and the lower bracket 35.

Meanwhile, the lighting device 36 may include a plate-shaped substrate 361 and a plurality of LEDs 362 disposed on the front surface of the substrate 361.

At this time, the substrate 361 may be configured in various shapes in which the LED 362 can be mounted and supported. For example, the substrate 361 may be defined in a rectangular plate shape, and may be configured to have a size that can be inserted into the mounting member 32. Of course, the substrate 361 may be divided into a plurality of pieces, and the divided substrates may be assembled to constitute the entire lighting device 36.

Both left and right ends of the substrate 361 may be inserted into the accommodation portion 324 formed on both left and right sides of the mounting member 32, and at least a portion of both ends of the substrate 361 is in contact with the inner surface of the accommodation portion 324 to prevent the substrate 361 from moving.

In addition, although the size of the substrate 361 is smaller than that of the panel 31, a surface on which a plurality of LEDs 362 are disposed at regular intervals may be formed to shine the entire area of the panel 31.

The LED 362 is configured to irradiate light of various colors. For example, the LED 362 may be composed of an RGB LED (Red Green Blue light emitting diode). In addition, the LED 362 may be composed of a small-sized micro LED. A plurality of the LEDs 362 may be spaced apart at set intervals, and the plurality of LEDs 362 may be disposed at equal intervals so that the panel 31 shines with uniform brightness and does not generate shadows. In addition, the LED 362 irradiates light with a set output to realize the set brightness, and at this time, the irradiation angle of the LED 362 is irradiated at a set angle so that overlapping of the light irradiated between neighboring LEDs 362 can be prevented to be capable of having an irradiation angle capable of uniformly shinning the panel 31. For example, the irradiation angle α of the LED 362 may be 120°. Of course, if light of various colors can be irradiated, other light sources other than the LED 362 may be mounted on the substrate. Accordingly, the LED 362 may also be referred to as a light source.

Meanwhile, the lighting device 36 may be configured to maintain set intervals from the panel 31 or the mounting member 32. To this end, a spacer 33 may be provided in front of the lighting device 36. The door 20 to which the panel assembly 30 is mounted has a use environment in which the door is repeatedly opened and closed, and when the door 20 is repeatedly opened and closed, direct impact to the LED 362 should be prevented. In addition, since the LED 362 maintains set intervals from the panel 31 or the mounting member 32, the brightness of the panel 31 is maintained uniformly when the lighting device 36 is driven, and it is possible to prevent a locally brightly shining spot from occurring at the position where the LED 362 is disposed.

The spacer 33 may maintain set intervals between the LED 362 and the panel 31 or mounting member 32. In addition, the spacer 33 may keep a state in which the lighting device 36 is fixed at a set position.

The spacer 33 may be formed in a plate shape corresponding to the size of the lighting device 36 and may be seated on the front surface of the lighting device 36. Accordingly, the front surface of the spacer 33 may contact the front surface portion 321 of the mounting member 32 and the rear surface of the spacer 33 may contact the substrate 361. If the mounting member 32 is not disposed or has a different structure, the front surface of the spacer 33 may contact the panel 31 and the rear surface thereof may contact the substrate 361.

At this time, the thickness of the spacer 33 may be formed to be thicker than the protruding height of the LED 362. Therefore, due to the disposition of the spacer 33, the LED 362 inevitably does not come into contact with the panel 31 or the mounting member 32.

In detail, the spacer 33 may include a spacer body 331 formed in a plate shape and a plurality of through-holes 332 penetrating the spacer body 331. The number of through-holes 332 corresponding to positions corresponding to those of the LEDs 362 may be formed. In addition, the LED 362 may be formed to be accommodated in the through-hole 332. For example, the through-hole 332 may be formed in a circular shape. In addition, the inner surface of the through-hole 332 may be formed to increase in width as it goes forward, and may be formed so that the light irradiated from the LED 362 does not interfere.

That is, the width of the rear surface of the through-hole 332 is larger than the width of the LED 362 so that the LED 362 can be accommodated, In addition, the width of the front surface of the through-hole 332 may be formed larger than the width of the rear surface of the through-hole 332. In this case, the edge of the open front surface of the through-hole 332 may be positioned outside the irradiation angle α of the LED 362. Accordingly, it is possible to prevent light irradiated from the LED 362 from being blocked or shaded by the spacer 33.

For example, the spacer body 331 may include a first support portion 331a supported by the substrate 361, an inclined portion inclined in a direction away from the center of the LED 362 at an upper end of the first support portion 331a, and a second support portion 331c protruding forward from an upper end of the inclined portion 331b. That is, the inner surface of the through-hole 332 may be formed by the first support portion 331a, the inclined portion 331b, and the second support portion 331c.

The first support portion 331a and the second support portion 331c may extend in a direction perpendicular to the substrate 361. In addition, the front end of the first support portion 331a and the rear end of the second support portion 331c may be connected by the inclined portion 331b. The width of the first support portion 331a may be greater than that of the second support portion 331c. Accordingly, the spacer 33 can be stably seated on the substrate 361 by the first support portion 331a, and the contact area between the first support portion 331a and the substrate 361 may be defined larger than the contact area between the second support portion 331c and the mounting member 32.

The width of the second support portion 331c may be smaller than that of the first support portion 331a and may be formed to provide a minimum area capable of supporting the mounting member 32. Therefore, it is possible to prevent shadow generation at the contact portion of the second support portion 331c.

Meanwhile, the spacer 33 may be formed of a material capable of transmitting light, or may be formed of a transparent or translucent material. Accordingly, even if some of the light irradiated from the LED 362 is directed to the spacer 33, some of the light may pass through the spacer 33 and be directed to the panel 31. In addition, the spacer 33 may include an additive material such as a diffusion agent for diffusing light irradiated from the LED 362, and light directed toward the panel 31 is diffused so that the entire front surface of the panel 31 can shine with uniform brightness.

The spacer 33 may be mounted on the mounting member 32 while being seated on the substrate 361. That is, the spacer 33 and the lighting device 36 may be inserted into the accommodation portion 324 of the mounting member 32 in a coupled state. Both left and right ends of the spacer 33 and the lighting device 36 may be constrained by the side surface portion 322. That is, the sum of the thicknesses of the spacer 33 and the substrate 361 may correspond to the distance between the front surface portion 321 and the rear surface portion 323. When the spacer 33 and the lighting device 36 are inserted into the accommodation portion 324 in a state of being in contact with each other, the mounting member 32, the spacer 33, and the lighting device 36 can maintain a fixed state without moving with each other.

Meanwhile, the back cover 39 may be coupled in a state in which the spacer 33 and the lighting device 36 are mounted on the mounting member 32. The back cover 39 can shield the entire rear surface of the lighting device 36 and forms the rear surface of the panel assembly 30.

In addition, the upper and lower ends of the circumferential portion 392 of the back cover 39 are coupled to the upper bracket 34 and the lower bracket 35, and both left and right ends of the circumferential portion of the back cover 39 may be mounted so as to come into contact with the rear surface portion 323 of the mounting member 32. Therefore, by mounting the back cover 39, the overall coupling structure of the mounting member 32, the upper bracket 34, the lower bracket 35, the lighting device 36, and the spacer 33 constituting the panel assembly 30 may be completed.

Meanwhile, the protrusion 391 of the back cover 39 may protrude between the rear surface portion 323 of the mounting member 32 and support the substrate 361 from the rear. In addition, the protrusion 391 may protrude in a shape capable of surface contact so as to entirely support the rear surface of the substrate exposed between the rear surface portions 323.

The back cover 39 may be preferably formed of a metal material to maintain overall strength of the panel assembly 30. When the back cover 39 is made of a metal material, the static electricity generated from the door 20 when the back cover 39 is directly in contact with or adjacent to the substrate 361 is transferred to the substrate through the back cover 39 and thus there is a possibility that the lighting device 36 may be damaged. In particular, the door 20 is in frequent contact with the user's body and is highly likely to generate static electricity and when the panel assembly 30 is minimized to secure the insulation thickness of the door 20, the back cover 39 and the substrate 361 are inevitably close to each other, and the possibility of damage to the lighting device 36 may increase when static electricity is generated.

In order to prevent this problem, an insulator 38 may be provided on the front surface of the back cover 39. The insulator 38 serves to electrically insulate between the back cover 39 and the substrate 361 and may be disposed between the back cover 39 and the substrate 361. The insulator 38 may be formed in a plate-like plate or sheet shape, and at least a portion thereof may be formed to contact the substrate 361 and the back cover 39, respectively. For example, the insulator 38 may be formed in a sheet shape and attached to the front surface of the back cover 39, and may be defined in a shape corresponding to the shape of the back cover 39.

Hereinafter, an operation of changing the appearance of the front surface of the refrigerator 1 having the above structure will be described in more detail with reference to drawings.

Figure 7:
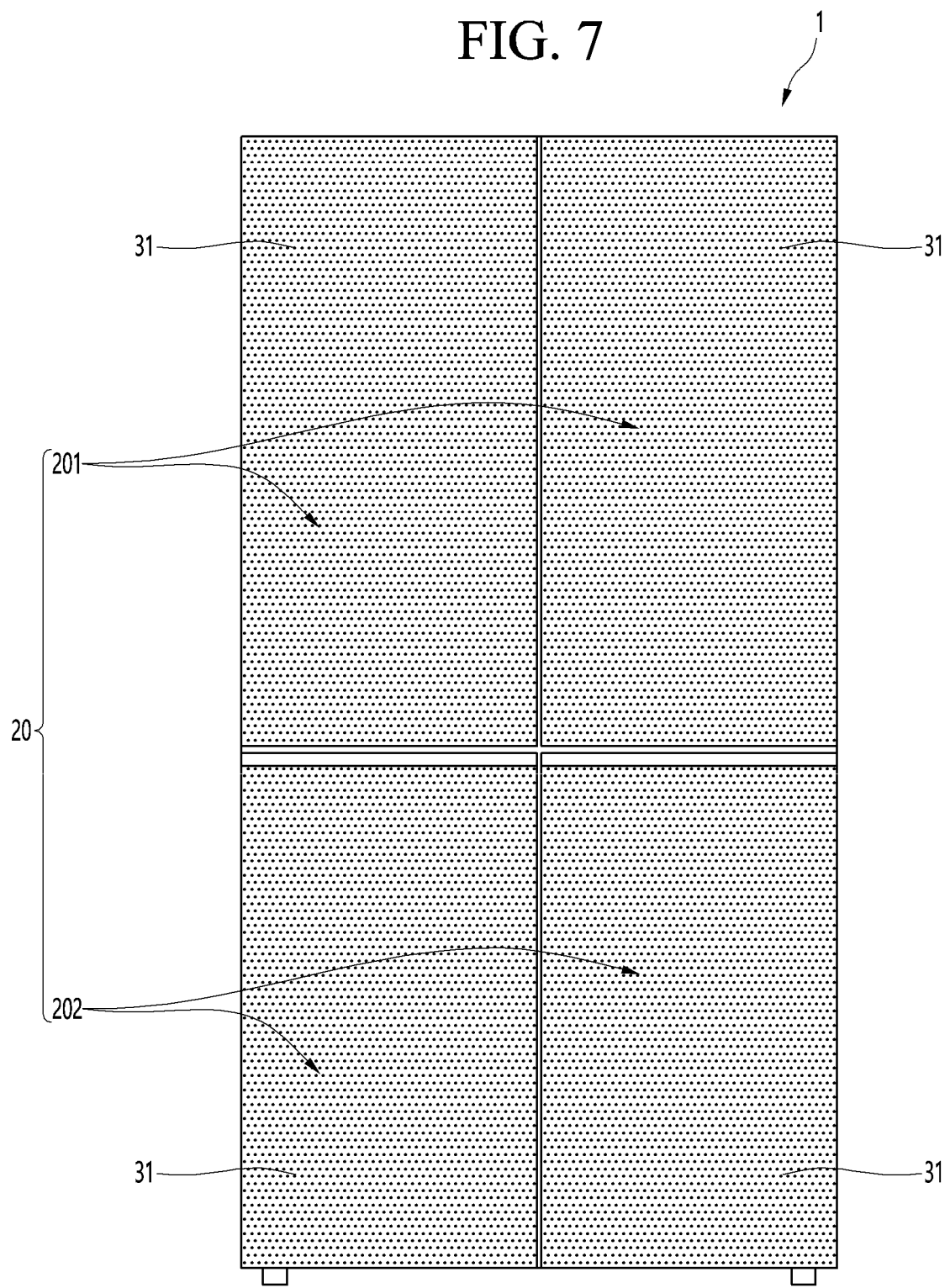
FIG. 7 is a front view illustrating a state in which the front surface color of the door is changed by driving the lighting device of the door.
Figure 8:
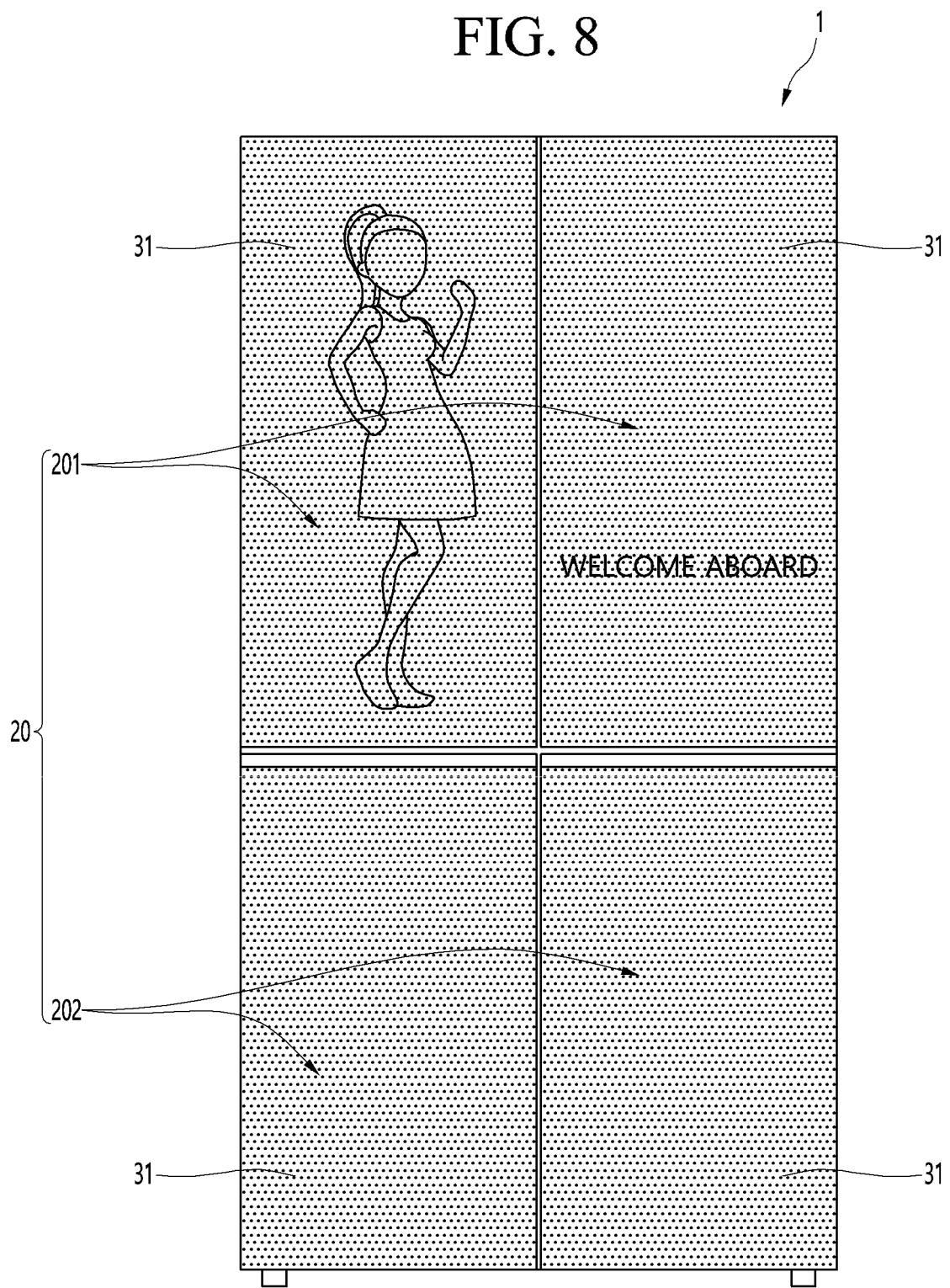
FIG. 8 is a front view illustrating a state in which the lighting device of the door is driven and the output is made on the front surface of the door.

FIG. 7 is a front view illustrating a state in which the front surface color of the door is changed by driving the lighting device of the door, and FIG. 8 is a front view illustrating a state in which the lighting device of the door is driven and the output is made on the front surface of the door.

In a state in which the lighting device 36 is turned off, the color of the outer appearance of the front surface can be expressed by the color of the panel 31. A color displayed on the panel 31 when the lighting device 36 is turned off may be referred to as a first color.

When the lighting device 36 is operated, the color of the panel 31 is changed according to the color of the light irradiated from the lighting device 36, and the color of the outer appearance of the front surface of the door 20 can be expressed as the selected color. At this time, the color displayed through the panel by the light irradiated from the lighting device 36 may be referred to as a second color.

The color of the panel 31 may be determined by the operation of the lighting device 36. For example, the lighting device 36 may be operated and set through a remote device (2 in FIG. 16) separate from the refrigerator 1. For example, the remote device 2 may be various devices capable of communication, such as a dedicated terminal, a mobile phone, a tablet, a portable PC, a desktop PC, a remote controller, and a Bluetooth speaker.

The user can generally manipulate and set the operating state of the lighting device 36, such as the operating time, operating conditions, and light emission color of the light source of the lighting device 36, through manipulation of the remote device 2. For example, simple manipulation and setting of the lighting device 36 may be possible through an application installed in a user's mobile phone or a dedicated program. That is, the user can select a desired color of the panel 31 through the screen of the remote device 2 such as a mobile phone or a terminal.

In addition, the user may input a color through a manipulation portion provided in the refrigerator 1 without using the remote device 2.

Figure 16:
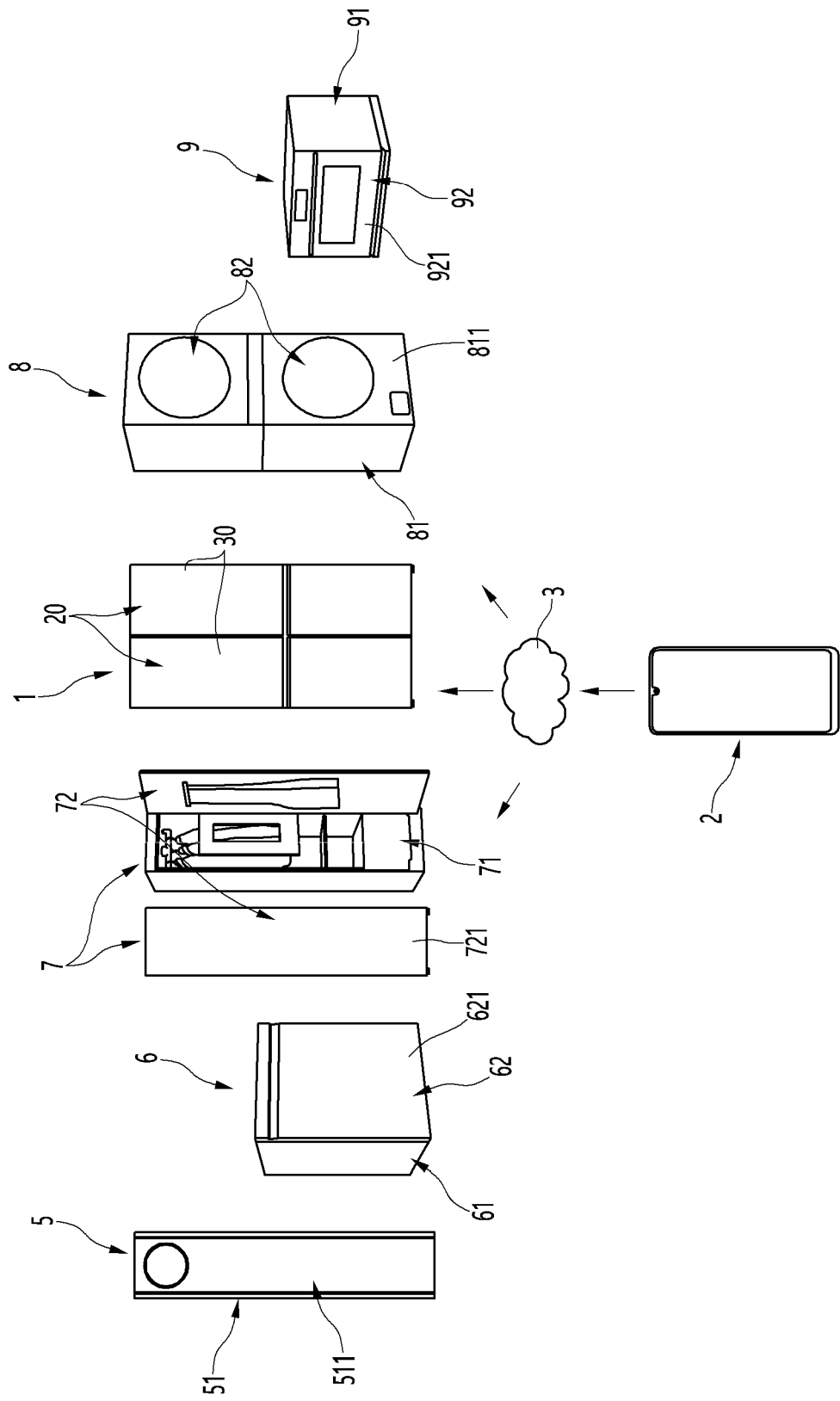
FIG. 16 is a view illustrating an example of adjusting colors of home appliances to which the panel assembly is applied using a remote device.

In addition, the refrigerator 1 and the remote device 2 may be connected to the server in a network state, and thus, the color of the panel 31 of the refrigerator 1 may be input through the server (3 in FIG. 16).

Meanwhile, looking at the operating state of the lighting device 36, as illustrated in FIG. 6, when the lighting device 36 is turned on, the light irradiated from the LED 362 can be irradiated toward the rear surface of the panel 31.

That is, the light irradiated from the LED 362 passes through the spacer 33 and passes through the front surface portion 321 of the mounting member 32, is reflected, refracted, or diffused while passing through the front surface portion 321, and thus can be evenly irradiated to the entire rear surface of the panel 31. In addition, the light passing through the front surface portion 321 shines the panel 31, and the front surface of the door 20 may shine with a set brightness or color.

In a state in which the lighting device 36 is turned off, as illustrated in FIG. 1, the front surface of the door 20 does not shine and is seen in the original color of the panel assembly 30, that is, the first color. In this state, the lighting device 36 may be turned on, and when the lighting device 36 is turned on, the front surface of the door 20 shines in a second color selected by the user.

For example, as illustrated in FIG. 16, the controller can control the front surface of the door 20 to shine in a second color different from the first color, and the lighting device 36 may cause the LED 362 to shine in a set color according to the control of the controller. At this time, the color of the panel 31 can be selected by the user and can be selected by manipulating the remote device 2.

Meanwhile, when the controller instructs to change the color of the light irradiated from the lighting device 36 while the outer appearance of the front surface of the refrigerator 1 shines in a set color, the panel 31 shines in a different color reset by the controller.

In addition, the panel 31 constituting some door 20 of the plurality of doors 20 forming the outer appearance of the front surface of the refrigerator 1 emits light, or the panel 31 constituting the plurality of doors 20 may independently emit light in different colors to define the outer appearance of the front surface of the refrigerator 1.

In addition, as illustrated in FIG. 8, it may be possible to output a screen through the panel 31 by operating the lighting device 36.

In detail, through turned on and off of the plurality of LEDs 362 constituting the lighting device 36 and/or the color of the LEDs 362 that are turned on, characters, pictures, figures, images, and videos can be output on the panel 31. That is, the panel assembly 30 may function like an output device displaying a kind of screen that can be expressed by the lighting device, and thus the panel 31 may be referred to as a screen or a display.

In addition, the operation of the lighting device 36 that outputs the screen can be set by the user through a program or application built in the remote device 2. Therefore, the user can freely output desired images, images, texts, or the like to the panel 31 through the user's manipulation of the remote device 2 rather than direct manipulation of the refrigerator 1, and thus this has the advantage of being able to deliver information to the user.

In addition, the refrigerator 1 is connected to the user's remote device 2 and the server through a network to communicate necessary information, and based on the information acquired through communication, it can be displayed on the panel 31.

Meanwhile, various other embodiments of the present disclosure may be possible in addition to the above-described embodiments. A second embodiment of the present disclosure is characterized in that a transmission portion is formed in the spacer. In the second embodiment of the present disclosure, other configurations except for the structure of the spacer are the same as those of the previous embodiment, so to prevent duplication of description, detailed descriptions and illustrations of the same configurations will be omitted and the same reference numerals will be used to denote the same configurations.

Hereinafter, a second embodiment of the present disclosure will be described in more detail with reference to the drawings.

Figure 9:
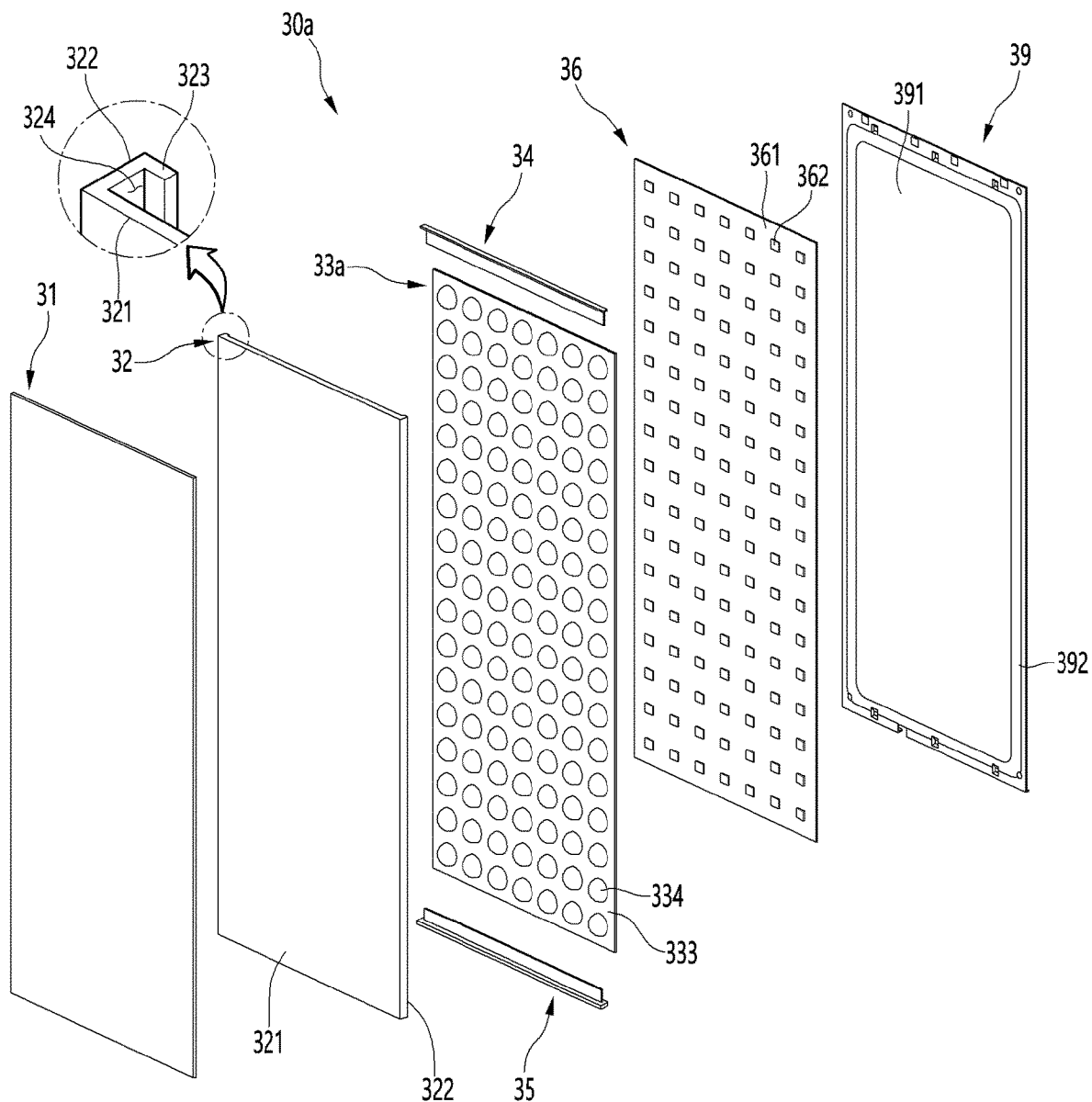
FIG. 9 is an exploded perspective view of a panel assembly according to a second embodiment of the present disclosure.
Figure 10:
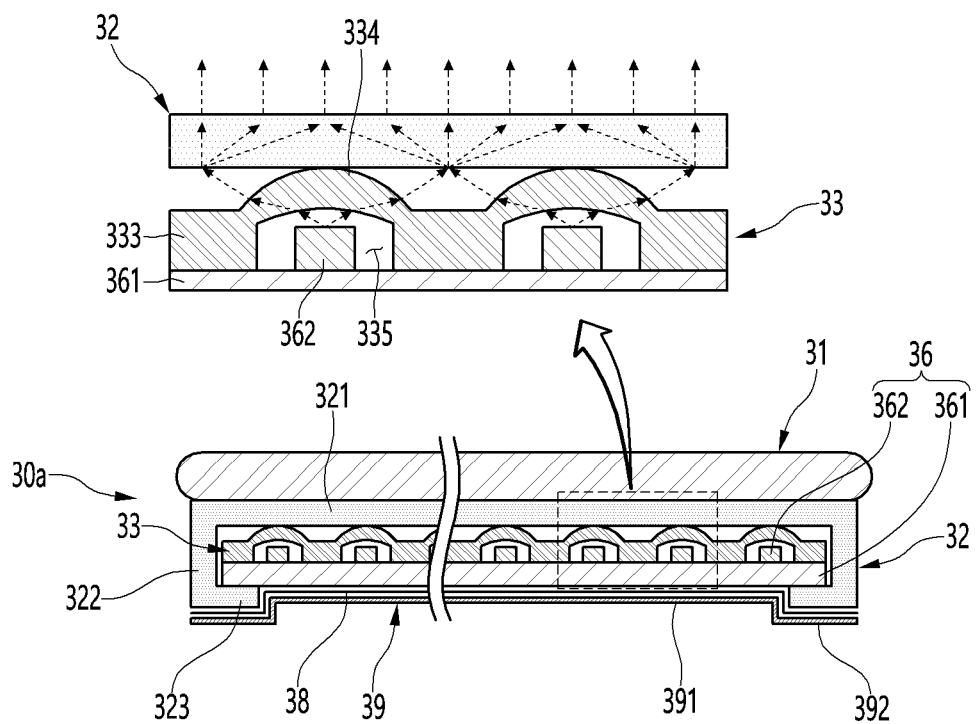
FIG. 10 is a cross-sectional view of the panel assembly.

FIG. 9 is an exploded perspective view of a panel assembly according to a second embodiment of the present disclosure, and FIG. 10 is a cross-sectional view of the panel assembly, illustrating a cross-section at a position corresponding to A-A' in FIG. 4.

As illustrated in the drawing, the panel assembly 30*a* according to the second embodiment of the present disclosure may include the panel 31, a lighting device 36, and a back cover 39. In addition, the panel assembly 30*a* may further include the mounting member 32, and the mounting member 32 includes the front surface portion 321, the side surface portion 322, the rear surface portion 323, and the accommodation portion 324 so that the lighting device 36 may be mounted thereon. A spacer 33*a* may be further provided between the mounting member 32 and the lighting device 36. In addition, the upper bracket 34 and the lower bracket 35 may be mounted on upper and lower ends of the mounting member 32.

The lighting device 36 may include a plate-shaped substrate 361 and a plurality of LEDs 362 disposed on the front surface of the substrate 361.

At this time, the substrate 361 may be configured in various shapes in which the LED 362 can be mounted and supported. Both left and right ends of the substrate 361 may be inserted into the accommodation portion 324 formed on both left and right sides of the mounting member 32, and at least a portion of both ends of the substrate 361 is in contact with the inner surface of the accommodation portion 324 to prevent the substrate 361 from moving.

The LED 362 is configured to irradiate light of various colors. For example, the LED 362 may be composed of an RGB LED. In addition, the LED 362 may be composed of a micro LED. A plurality of the LEDs 362 may be spaced apart at set intervals, and may have an irradiation angle capable of uniformly shining the panel 31 so that the panel 31 shines with uniform brightness and does not generate shadows. For example, the irradiation angle α of the LED 362 may be 120°.

Meanwhile, the lighting device 36 may be configured to maintain set intervals from the panel 31 or the mounting member 32. To this end, a spacer 33*a* may be provided in front of the lighting device 36.

The spacer 33*a* may be formed in a plate shape corresponding to the size of the lighting device 36 and may be seated on the front surface of the lighting device 36. Accordingly, the front surface of the spacer 33*a* may contact the front surface portion 321 of the mounting member 32 and the rear surface of the spacer 33*a* may contact the substrate 361. If the mounting member 32 is not disposed or it has a different structure, the front surface of the spacer 33*a* may contact the panel 31 and the rear surface thereof may contact the substrate 361.

In addition, the spacer 33*a* prevents the LED 362 from contacting the front component and at the same time allows the light irradiated from the LED 362 to be uniformly irradiated toward the panel 31.

The spacer 33*a* may be formed of a material capable of transmitting light, or may be formed of a transparent or translucent material. Accordingly, light irradiated from the LED 362 may pass through the spacer 33*a* and be directed to the panel 31. In addition, the spacer 33*a* may include an additive material such as a diffusion agent for diffusing light emitted from the LED 362, and the light directed to the panel 31 is diffused so that the panel 31 can be evenly shined.

In detail, the spacer 33*a* may include a spacer body 333 formed in a plate shape, an LED accommodation portion 335 defining a space for accommodating the LED 362 inside the spacer body 333, and a transmission portion 334 through which light of the LED 362 is refracted.

The spacer body 333 may be formed in a rectangular plate shape, and front and rear surfaces may be formed in a flat shape. In addition, the LED accommodation portion 335 may be formed on a rear surface of the spacer body 333. The LED accommodation portion 335 may be formed in a number corresponding to a position corresponding to the LED 362. In addition, the LED accommodation portion 335 may be formed to accommodate the LEDs 362 one by one therein. For example, the LED accommodation portion 335 may be formed in a forward recessed groove shape and may have a circular cross section. In addition, the LED accommodation portion 335 may be formed to have a width and a depth that do not contact any portion of the LED 362.

In addition, a transmission portion 334 may be formed on the front surface of the spacer 33*a* corresponding to the LED accommodation portion 335. The transmission portion 334 may be located at a position facing the front end of the LED 362, and the center of the transmission portion 334 may be located on the same extension line as the center of the LED 362. In addition, the central portion of the transmission portion 334 protrudes most forward and may be formed in a curved shape that decreases from the center to the edge of the transmission portion 334. That is, the transmission portion 334 may be formed round to have a predetermined curvature, and the light irradiated from the LED 362 can be refracted while passing through the transmission portion 334 and be evenly irradiated toward the panel 31.

In addition, the front and rear surfaces of the transmission portion 334, that is, the outer surface and the inner surface of the transmission portion 334 may be formed to have different curvatures. The transmission portion 334 may be formed in a shape in which a central portion is thickest and becomes thinner toward an edge. Due to the shape of the transmission portion 334 and the spacing of the plurality of LED accommodation portions 335, the light irradiated from the neighboring LEDs 362 is evenly irradiated throughout the panel 31 without overlapping or interfering with each other, and thus the entire front surface of the panel 31 may be illuminated with uniform brightness. Since the transmission portion 334 is formed in the same shape as a lens, it may be referred to as a lens portion, and may also be referred to as a refraction portion, a shielding portion, and the like.

Meanwhile, the spacer 33*a* may be mounted on the mounting member 32 while being seated on the substrate. That is, the spacer 33*a* and the lighting device 36 may be inserted into the accommodation portion 324 of the mounting member 32 in a coupled state. Both left and right ends of the spacer 33*a* and the lighting device 36 may be constrained by the side surface portion 322.

The back cover 39 may be coupled in a state in which the spacer 33*a* and the lighting device 36 are mounted on the mounting member 32. The back cover can shield the entire rear surface of the lighting device 36 and forms the rear surface of the panel assembly 30*a*.

In addition, the upper and lower ends of the circumferential portion 392 of the back cover 39 are coupled to the upper bracket 34 and the lower bracket 35, and both left and right ends of the circumferential portion 392 of the back cover 39 may be mounted so as to come into contact with the rear surface portion 323 of the mounting member 32. Therefore, by mounting the back cover 39, the overall coupling structure of the mounting member 32, the upper bracket 34, the lower bracket 35, the lighting device 36 and the spacer 33*a* constituting the panel assembly 30*a* may be completed.

The back cover 39 may be formed of a metal material to maintain overall strength of the panel assembly 30*a*. When the back cover 39 is made of a metal material and the back cover 39 is in direct contact with or adjacent to the substrate 361, an insulator 38 may be provided on the front surface of the back cover 39.

Meanwhile, various other embodiments of the present disclosure may be possible in addition to the above-described embodiments. A third embodiment of the present disclosure is characterized in that a transmission portion is formed in the spacer. In the third embodiment of the present disclosure, other configurations except for the structure of the spacer are the same as those of the previous embodiment, so to prevent duplication of description, detailed descriptions and illustrations of the same configurations will be omitted and the same reference numerals will be used to denote the same configurations.

Hereinafter, a third embodiment of the present disclosure will be described in more detail with reference to the drawings.

Figure 11:
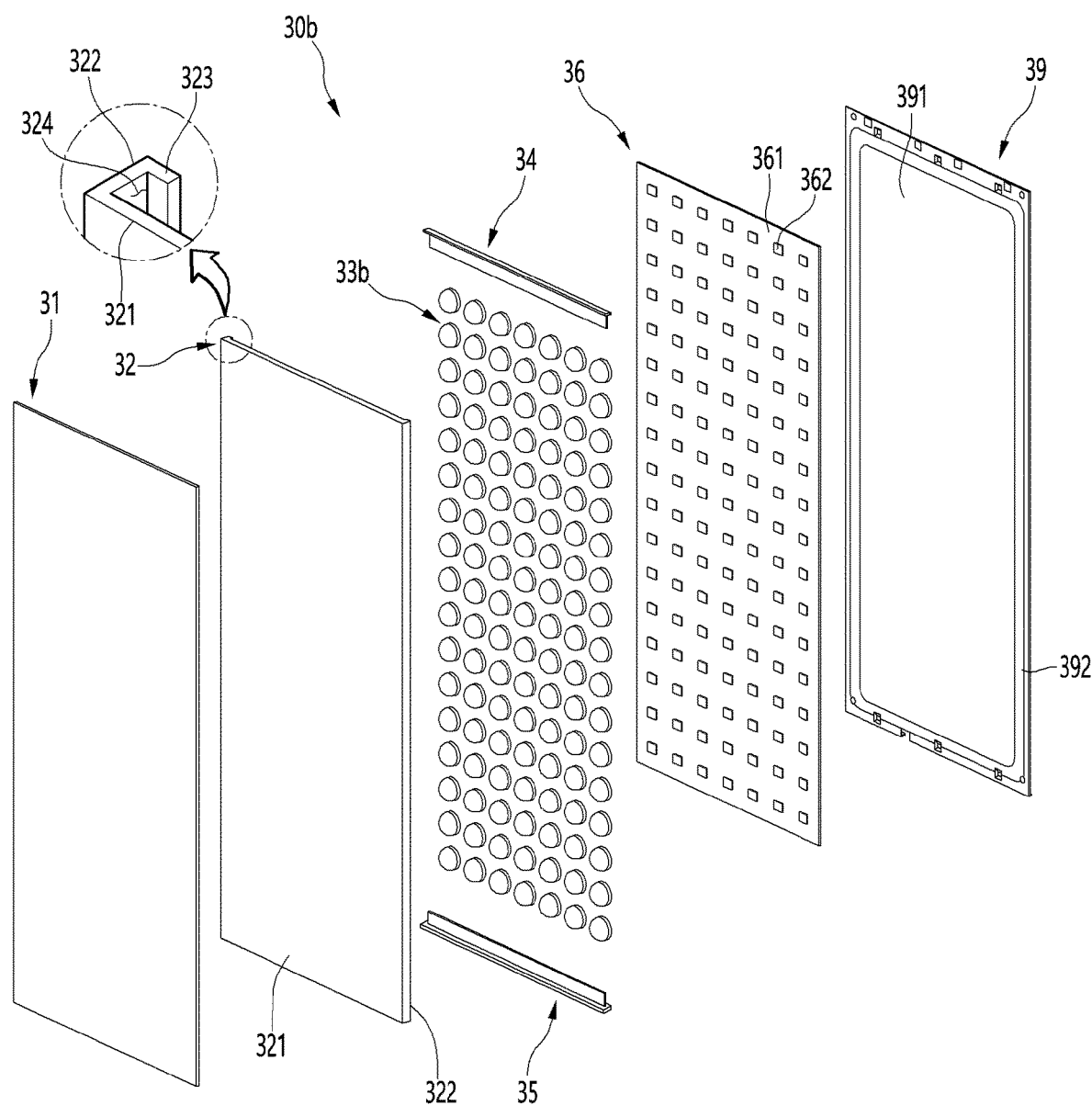
FIG. 11 is an exploded perspective view of a panel assembly according to a third embodiment of the present disclosure.
Figure 12:
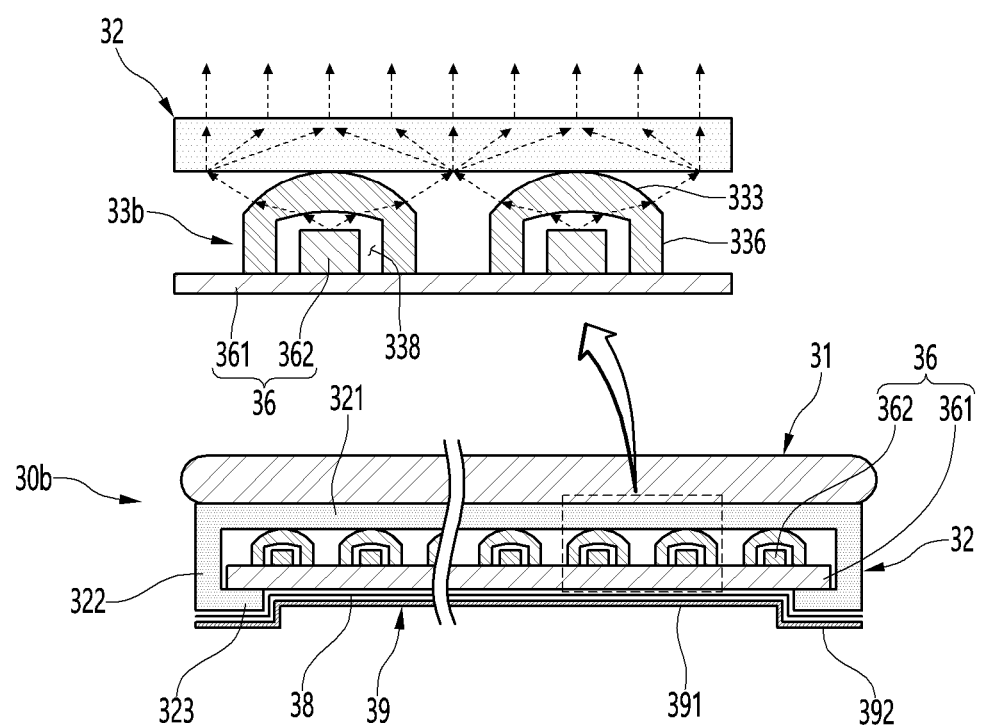
FIG. 12 is a cross-sectional view of the panel assembly.

FIG. 11 is an exploded perspective view of a panel assembly according to a third embodiment of the present disclosure, and FIG. 12 is a cross-sectional view of the panel assembly, illustrating a cross-section at a position corresponding to A-A' in FIG. 4.

As illustrated in the drawing, the panel assembly 30*b* according to the third embodiment of the present disclosure may include the panel 31, a lighting device 36, and a back cover 39. In addition, the panel assembly 30*b* may further include the mounting member 32, and the mounting member 32 may include the front surface portion 321, the side surface portion 322, the rear surface portion 323, and the accommodation portion 324 so that the lighting device 36 is mounted. In addition, a spacer 33*b* may be further provided between the mounting member 32 and the lighting device 36. In addition, the upper bracket 34 and the lower bracket 35 may be mounted on upper and lower ends of the mounting member 32.

The lighting device 36 may include a plate-shaped substrate 361 and a plurality of LEDs 362 disposed on the front surface of the substrate 361.

At this time, the substrate 361 may be configured in various shapes in which the LED 362 can be mounted and supported. Both left and right ends of the substrate 361 may be inserted into the accommodation portion 324 formed on both left and right sides of the mounting member 32, and at least a portion of both ends of the substrate 361 may be in contact with the accommodation portion 324 to prevent the substrate 361 from moving.

The LED 362 is configured to irradiate light of various colors. For example, the LED 362 may be composed of an RGB LED. The LED 362 may be composed of a micro LED. A plurality of the LEDs 362 may be spaced apart at set intervals, and the LED 362 may has an irradiation angle α capable of uniformly shining the panel 31 by making the panel 31 shine with uniform brightness and not generate shadows. For example, the irradiation angle α of the LED 362 may be 120°.

Meanwhile, the lighting device 36 may be configured to maintain set intervals from the panel 31 or the mounting member 32. To this end, a spacer 33*b* may be provided in front of the lighting device 36.

The spacer 33*b* may be provided between the substrate 361 and the mounting member 32. Accordingly, the front surface of the spacer 33*b* may contact the front surface portion 321 of the mounting member 32 and the rear surface of the spacer 33*b* may contact the substrate 361. If the mounting member 32 is not disposed or has a different structure, the front surface of the spacer 33*b* may contact the panel 31 and the rear surface may contact the substrate 361.

Further, the spacer 33*b* prevents the LED 362 from coming into contact with the front component and at the same time allows the light irradiated from the LED 362 to be uniformly radiated toward the panel 31.

The spacer 33*b* may be formed of a material capable of transmitting light, or may be formed of a transparent or translucent material. Accordingly, light emitted from the LED 362 may pass through the spacer 33*b* and be directed to the panel 31. In addition, the spacer 33*b* may include an additive material such as a diffusion agent for diffusing light irradiated from the LED 362, and the light directed to the panel 31 is diffused so that the panel 31 can evenly shine.

In addition, the spacer 33*b* may be provided in a number corresponding to a position corresponding to the LED 362, and each spacer 33*b* may be independently mounted on the substrate 361 and configured to support the mounting member 32. In addition, each spacer may be formed in the same shape so that light irradiated from the LED 362 may be uniformly irradiated toward the panel 31.

In detail, the spacer 33*b* is supported on the substrate 361 and may include an edge portion 336 forming a space in which the LED 362 is accommodated, and a transmission portion 337 that refracts light of the LED 362.

The edge portion 336 is formed in a tubular shape with open front and rear surfaces, and may extend to form an LED accommodation portion 338, which is a space in which the LED 362 is accommodated. For example, the edge portion 336 may be formed in a cylindrical shape. The edge portion 336 protrudes forward from the front surface of the substrate 361, and the height of the edge portion 336 may be higher than the protruding height of the LED 362. The LED accommodation portion 338 accommodating the LED 362 is formed inside the edge portion 336 and may be formed to have a width and a depth that do not contact any portion of the LED 362.

In addition, a transmission portion 337 may be formed at a front end of the edge portion 336. The transmission portion 337 may be formed to shield the open front surface of the edge part 336. The transmission portion 337 may be located at a position facing the front end of the LED 362, and the center of the transmission portion 337 may be located on the same extension line as the center of the LED 362. In addition, the central portion of the transmission portion 337 protrudes most forward and may be formed in a curved shape that decreases from the center to the edge of the transmission portion 337. That is, the transmission portion 337 may be formed round to have a predetermined curvature, and the light irradiated from the LED 362 is refracted while passing through the transmission portion 337 and can be evenly irradiated toward the panel 31.

In addition, the front and rear surfaces of the transmission portion 337, that is, the outer surface and the inner surface of the transmission portion 337 may be formed to have different curvatures. The transmission portion 337 may be formed in a shape in which a central portion is thickest and becomes thinner toward an edge. Due to the shape of the transmission part 337 and the spacing of the plurality of spacers 33b, the light irradiated from the adjacent LEDs 362 is evenly irradiated to the entire panel 31 without overlapping or interfering with each other and thus the entire panel 31 may shine with uniform brightness. Since the transmission portion 337 is formed in the same shape as a lens, the transmission portion may be referred to as a lens portion and may also be referred to as a refraction portion, a shielding portion, and the like. In addition, the spacer 33b may be referred to as an LED cap, a lens cap, or a cap.

Meanwhile, the spacer 33b may be mounted on the mounting member 32 while being seated on the substrate 361. That is, the spacer 33b and the lighting device 36 may be mounted on the mounting member 32 in a coupled state. At this time, both left and right ends of the substrate 361 of the lighting device 36 are inserted into the accommodation portion 324, and the protruding front end of the spacer 33b comes into contact with the front surface portion 321.

That is, the distance between the protruding front end of the spacer 33b and the rear surface of the substrate 361 may correspond to the distance between the front surface portion 321 and the rear surface portion 323, and therefore, the spacer 33b may be fixed at the mounting member 32 in a state of being mounted on the lighting device 36.

The back cover 39 may be coupled in a state in which the spacer 33b and the lighting device 36 are mounted on the mounting member 32. The back cover 39 can shield the entire rear surface of the lighting device 36 and forms the rear surface of the panel assembly 30b.

In addition, the upper and lower ends of the circumferential portion 392 of the back cover 39 are coupled to the upper bracket 34 and the lower bracket 35, and both left and right ends of the circumferential portion 392 of the back cover 39 may be mounted so as to come into contact with the rear surface portion 323 of the mounting member 32. Therefore, by mounting the back cover 39, the overall coupling structure of the mounting member 32, the upper bracket 34, the lower bracket 35, the lighting device 36, and the spacer 33b, constituting the panel assembly 30b can be completed.

The back cover 39 may be preferably formed of a metal material to maintain overall strength of the panel assembly 30b. When the back cover 39 is made of a metal material and the back cover 39 is in direct contact with or adjacent to the substrate 361, an insulator 38 may be provided on the front surface of the back cover 39.

Meanwhile, various other embodiments of the present disclosure may be possible in addition to the above-described embodiments. A fourth embodiment of the present disclosure is characterized in that the lighting device has a film-like structure and is directly attached to the panel. In the fourth embodiment of the present disclosure, other configurations except for some structures of the panel assembly are the same as those of the previous embodiment, so to prevent duplication of description, detailed descriptions and illustrations of the same configurations will be omitted and the same reference numerals will be used to denote the same configurations.

Hereinafter, a fourth embodiment of the present disclosure will be described in more detail with reference to the drawings.

Figure 13:
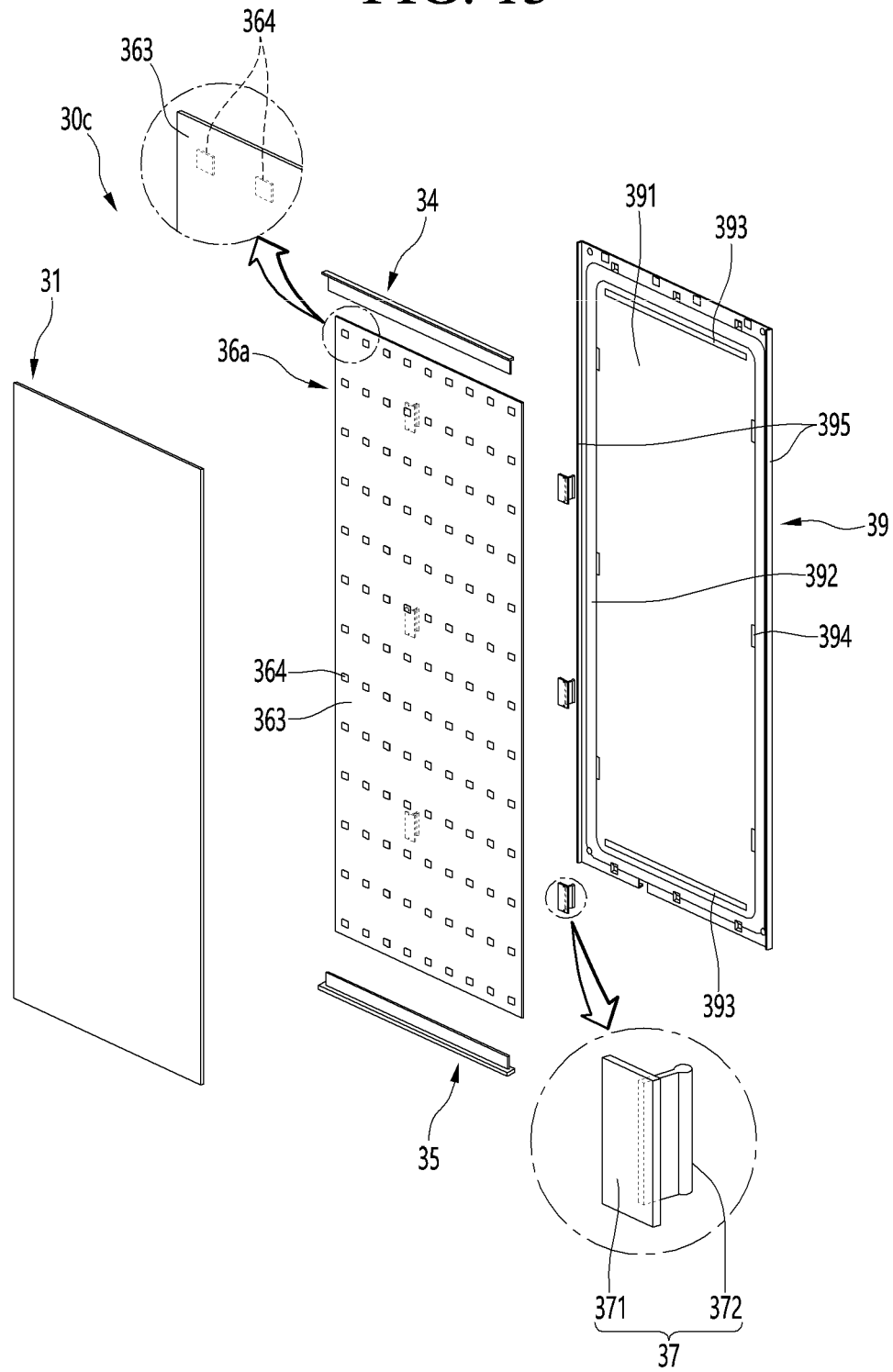
FIG. 13 is an exploded perspective view of a panel assembly according to a fourth embodiment of the present disclosure.
Figure 14:
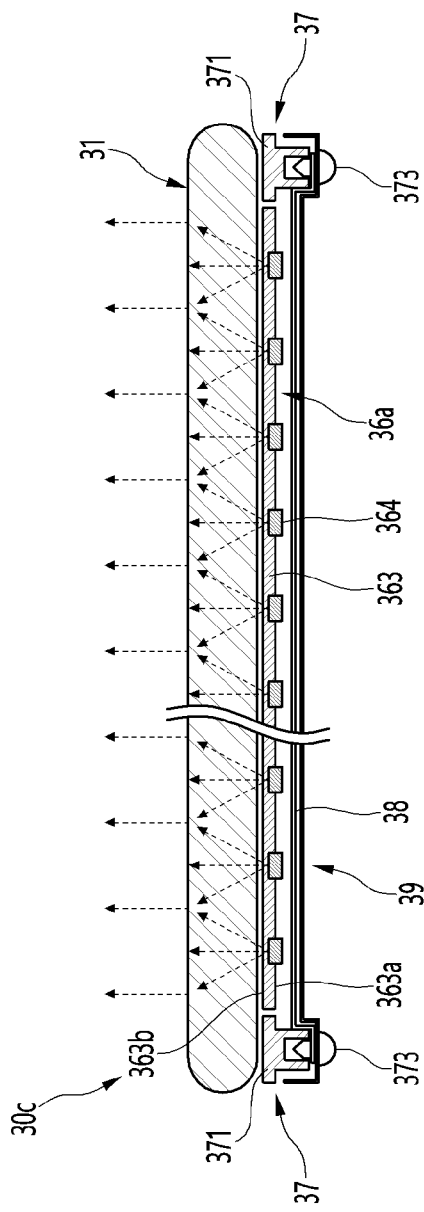
FIG. 14 is a cross-sectional view of the panel assembly.
Figure 15:
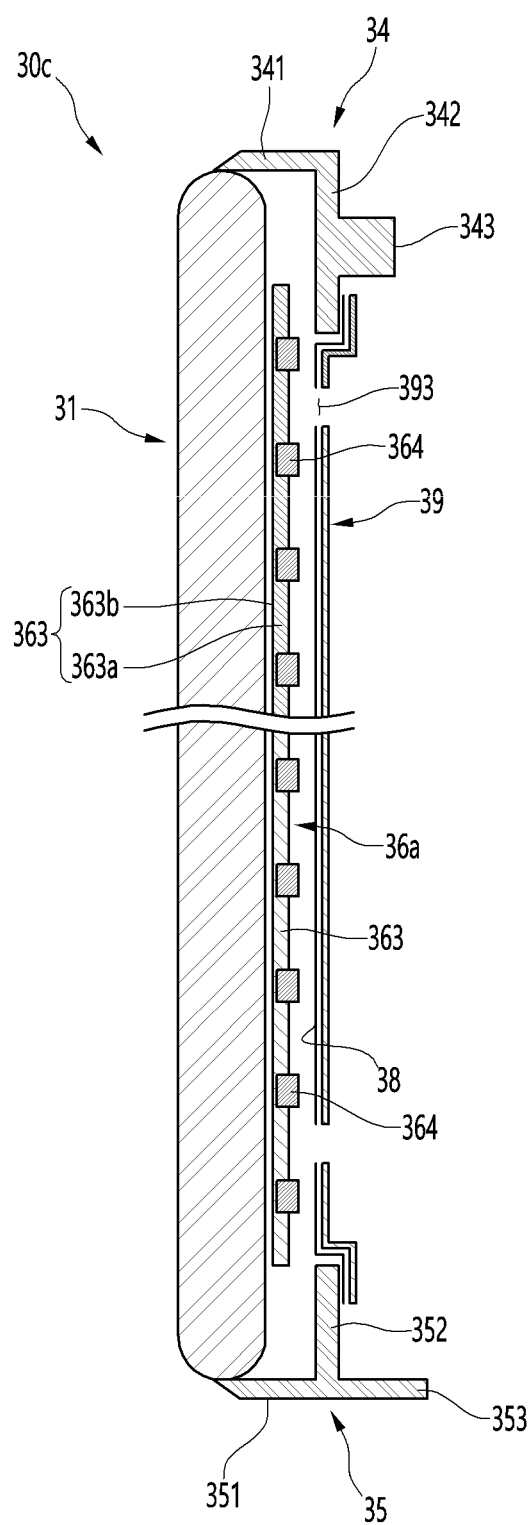
FIG. 15 is a longitudinal sectional view of the panel assembly.

FIG. 13 is an exploded perspective view of a panel assembly according to a fourth embodiment of the present disclosure, FIG. 14 is a cross-sectional view of the panel assembly, illustrating a cross-section at a position corresponding to A-A' in FIG. 4, and FIG. 15 is a longitudinal sectional view of the panel assembly.

As illustrated in the drawing, the panel assembly 30c according to the fourth embodiment of the present disclosure may include the panel 31, the lighting device 36a, and the back cover 39. In addition, the panel assembly 30c may further include an upper bracket 34 forming a top surface of the panel assembly 30c and a lower bracket 35 forming a bottom surface of the panel assembly 30c.

The lighting device 36a is provided behind the panel 31 and may be disposed to irradiate light toward the rear surface of the panel 31. The lighting device 36a may be formed in a plate or sheet shape parallel to the rear surface of the panel 31. In addition, at least a portion of the lighting device 36a may be formed in a flexible shape and may be formed in a film structure having at least one layer.

In detail, the lighting device 36a may include a base 363 and a plurality of LEDs 364 mounted on the base 363. The base 363 may be formed of one or more sheets and may be configured in the form of a film.

For example, the base 363 may be formed of a polyethylene terephthalate (PET) film material, and form a surface on which the LED 364 can be disposed. The base 363 may be formed to have a size corresponding to or slightly smaller than the size of the panel 31, and light irradiated from the LED 364 may be evenly irradiated to the entire panel 31 to shine the entire panel 31.

The base 363 may be formed of a flexible material and may be attached to the rear surface of the panel 31. At this time, the base 363 may be in contact with the panel 31 in a state where the LED 364 is disposed.

Meanwhile, the base 363 may be composed of a plurality of layers. For example, the base 363 may include a first layer 363a on which the plurality of LEDs 364 are disposed, and a second layer 363b disposed on the front surface of the first layer 363a to shield the LEDs 364. For example, the first layer 363a may be formed of a PT material, and the second layer 363b may be formed of a silicon material. In addition, an electrode connected to the LED 364 may be disposed between the first layer 363a and the second layer 363b.

The second layer 363b is configured to shield all of the plurality of LEDs 364. At least a portion may be formed to overlap the first layer 363a. In addition, the second layer 363b may be formed of a transparent material so that the light irradiated from the LED 364 is transmitted and directed toward the panel 31. In this case, the second layer 363b may be a diffusion sheet that diffuses light emitted from the LED 364.

The second layer 363b forms the front surface of the base 363, that is, the front surface of the lighting device 36a and may form a plane parallel to the rear surface of the panel 31. Accordingly, the entire surface of the second layer 363b may be in contact with the rear surface of the panel 31 and may be attached to the rear surface of the panel 31 by an adhesive. That is, the second layer 363b protects the LED 364 and at the same time provides a surface on which the lighting device 36a equipped with the LED 364 can be attached to the rear surface of the panel 31.

The LED 364 is configured to irradiate light of various colors. For example, the LED 364 may be composed of an RGB LED. In addition, the LED 364 may be configured as a micro LED. A plurality of the LEDs 364 may be spaced apart at set intervals, and the entire front surface of the panel 31 may shine with uniform brightness and may irradiate light at an irradiation angle set so that no shadow occurs. In particular, since the LED 364 is disposed close to the rear surface of the panel 31, it has a larger irradiation angle than the LEDs in other embodiments, so that, while being disposed close to the panel 31, the panel 31 can have uniform brightness. In addition, the LED 364 may have a lower output than the LEDs in other general embodiments so that spots are not locally generated even when disposed close to the rear surface of the panel 31.

Meanwhile, the lighting device 36a may be configured such that the LED 364 does not protrude or the protruding height thereof is minimized so as to be easily attached to the rear surface of the panel 31.

For example, the LED 364 may have a structure in which at least a part is embedded in the base 363. In addition, the LED 364 may be formed to protrude backward with respect to the front surface of the base 363. Accordingly, the front surface of the lighting device 36a may form a plane parallel to the rear surface of the panel 31, and the entire front surface of the lighting device 36a may be completely adhered to the rear surface of the panel 31. That is, the front surface of the LED 364 may be disposed the same as or rearward of the front surface of the base 363.

Meanwhile, an upper bracket 34 and a lower bracket 35 may be provided at upper and lower ends of the panel 31.

The upper bracket 34 may include an upper top surface portion 341 forming the top surface of the panel assembly 30c. The upper top surface portion 341 may support the upper end of the panel 31 and may shield the lighting device 36a on the rear side of the panel 31 from above.

In addition, the upper bracket 34 may include an upper rear surface portion 342. The upper rear surface portion 342 may extend downward from the rear end of the upper top surface portion 341. The upper rear surface portion 342 may provide a surface coupled with an upper end of the back cover 39.

An upper protrusion 343 may be provided on the upper rear surface portion 342. A plurality of the upper protrusions 343 may be disposed at regular intervals, and protrude backward to be combined with the upper mounting portion 431 of the upper cap decoration 43. In addition, the upper protrusion 343 may protrude through the back cover 39.

The lower bracket 35 may include a lower bottom surface portion 351 forming the bottom surface of the panel assembly 30c. The lower bottom surface portion 351 may support the lower end of the panel 31 and may shield the lighting device 36a on the rear surface of the panel 31 from below.

In addition, the lower bracket 35 may include a lower rear surface portion 352. The lower rear surface portion 352 may extend upward from the rear end of the lower bottom surface portion 351. The lower rear surface portion 352 may provide a surface coupled to the lower end of the back cover 39.

A lower protrusion 353 may be provided on the lower rear surface portion 352. A plurality of the lower protrusions 353 may be disposed at regular intervals, and protrude backward to be combined with the lower mounting portion 451 of the lower cap decoration 45. In addition, the lower protrusion 353 may protrude through the back cover 39.

In addition, fixing members 37 may be provided at both left and right ends of the rear surface of the panel 31. The fixing member 37 is for fixing both left and right ends of the panel assembly 30c to the door body 40 and may be mounted on the rear surface of the panel 31.

The fixing member 37 may include an adhesive portion 371 adhered to the rear surface of the panel 31 and a fixing protrusion 372 protruding from the adhesive portion 371. The front surface of the adhesive portion 371 may be formed in a planar shape and may be adhered to the rear surface of the panel 31. A screw 373 may be fastened to the adhesive portion 371. The screw 373 penetrates the back cover 39 and is fastened to the rear surface of the adhesive portion 371, and, by the screw 373, the back cover 39 and the fixing member 37 may be coupled to each other.

The fixing protrusion 372 may protrude backward from the rear surface of the adhesive portion 371 and may be inserted into and fixed to the fixture 411 formed on the front surface of the body plate 41. The fixing protrusion 372 may be formed in a hook-like shape and may be press-fit into the fixture 411. Meanwhile, the fixing protrusion 372 may protrude rearward through the opening of the back cover 39.

A plurality of fixing members 37 may be provided along both left and right ends of the panel 31. The plurality of fixing members 37 may be formed in the same shape. Of course, the fixing members 37 may be provided at both left and right ends of the panel 31, respectively, and may extend from the upper end to the lower end of the panel 31.

The back cover 39 may shield the entire rear surface of the lighting device 36a and form the rear surface of the panel assembly 30c. In addition, the upper and lower ends of the back cover 39 may be coupled to the upper bracket 34 and the lower bracket 35, and both left and right ends of the back cover 39 may be coupled to the fixing member 37.

In addition, the back cover 39 may include a protrusion 391 supporting the lighting device 36a and a circumferential portion 392 formed along the circumference of the protrusion 391. The protrusion 391 may protrude between the upper bracket 34 and the lower bracket 35 to support the rear surface of the lighting device 36a. In addition, the circumferential portion 392 is formed to be stepped along the circumference of the protrusion 391, and the upper and rear ends of the circumferential portion 392 may be coupled to the upper bracket 34 and the lower bracket 35.

In addition, cover side surface portions 395 may be formed at both left and right ends of the back cover 39. The cover side surface portions 395 may form both left and right sides of the panel assembly 30c and may shield the lighting device 36a from both left and right sides.

The back cover 39 may be preferably formed of a metal material to maintain overall strength of the panel assembly 30c. When the back cover 39 is made of a metal material and the back cover 39 is in direct contact with or adjacent to the substrate 361, an insulator 38 may be provided on the front surface of the back cover 39.

The insulator 38 may be formed in a sheet shape, and may be formed in a size capable of shielding at least the substrate 361 from the rear. In addition, the insulator 38 may be formed in a shape corresponding to that of the back cover 39. In addition, the insulator 38 may be attached to the front surface of the back cover 39.

In addition, a heat dissipation opening 393 may be formed in the back cover 39. The heat dissipation opening 393 may be formed by opening a portion of the back cover 39. A plurality of heat dissipation openings 393 may be formed. For example, one heat dissipation opening 393 may be formed on the top and bottom of the back cover 39, respectively. Heat generated when the lighting device 36a is driven may be discharged to the rear of the panel assembly 30c through the heat dissipation opening 393, and thus the lighting device 36a may be prevented from overheating.

Meanwhile, the panel assembly according to embodiments of the present disclosure may be applied not only to refrigerators but also to various other home appliances.

FIG. 16 is a view illustrating an example of adjusting colors of home appliances to which the panel assembly is applied using a remote device.

As illustrated in the drawing, the outer appearance of the home appliance according to the embodiment of the present disclosure may be formed by the panel assembly 30, and the outer appearance may be changed in a color set by the user according to the operation of the lighting device 36. The outer appearance of the panel assembly 30 can be expressed in various colors by the light of the lighting device 36 irradiated from the rear of the panel 31, and pictures, texts, images, and videos can also be displayed on the screen.

The home appliance may be any one of a refrigerator 1, an air conditioner 5, a dishwasher 6, a clothes manager 7, a washing machine 8, or a cooking appliance 9, each of which has a front surface of which a color of an outer appearance is freely changed by applying the same structure as the panel assemblies 30, 30a, 30b, 30c according to embodiments.

For example, in the above-described embodiment and in the refrigerator 1, the panel assembly 30 may be provided on a front side of the door 20 that opens and closes the cabinet 10. In addition, the panel assembly 30 may shine in a set color by user setting, and the outer appearance of the front surface of the refrigerator 1 may be changed in color.

As another example, an indoor unit of the air conditioner 5 may have a space in which a heat exchange device and a fan are provided inside a case 51 (or cabinet) that defines an outer appearance of the indoor unit. In addition, a front surface of the case 51 may be defined by a panel assembly 511. The panel assembly 511 may have the same structure as the panel assembly 30 of the refrigerator 1 to emit light.

Thus, the panel assembly 511 may shine in a set color by the user setting, and a color of the outer appearance of the front surface of the indoor unit of the air conditioner 5 may be changed into the set color.

As another example, in the dishwasher 6, a space for washing dishes may be defined inside a case 61 or a cabinet that defines an outer appearance of the dishwasher 6. In addition, the front surface of the case 61 may be opened and closed by the door 62, and the front surface of the door 62 may be defined by the panel assembly 621. The panel assembly 621 may have the same structure as the panel assembly 30 of the refrigerator 1 to emit light.

Thus, the panel assembly 621 may shine in a set color by the user setting, and a color of the outer appearance of the front surface of the dishwasher 6 may be changed into the set color.

As another example, in the clothes manager 7, a space for storing clothes may be defined inside a case 71 or a cabinet that defines an outer appearance of the clothes manager 7. In addition, the front surface of the case 71 may be opened and closed by the door 72, and the front surface of the door 72 may be defined by the panel assembly 721. The panel assembly 721 may have the same structure as the panel assembly 30 of the refrigerator 1 to emit light.

Thus, the panel assembly 721 may shine in a set color by the user setting, and a color of the outer appearance of the front surface of the clothes manager 7 may be changed into the set color.

As another example, in the washing machine 8 or a dryer, a space for washing or drying may be defined inside a case 81 (or cabinet) that defines an outer appearance of the washing machine 8. In addition, a front of the case 81 may be opened and closed by the door 82. The front surface of the case 81 may be defined by a panel assembly 811. The panel assembly 811 may have the same structure as the panel assembly 30 of the refrigerator 1 to emit light.

Thus, the panel assembly 30 may shine in a set color by the user setting, and a color of the outer appearance of the front surface of the washing machine 8 or the dryer of the air conditioner 8 may be changed into the set color.

As another example, in the cooking appliance 9, a space for cooking food may be defined inside a case 91 or a cabinet that defines an outer appearance of the cooking appliance. In addition, the front surface of the case 91 may be opened and closed by the door 92, and the front surface of the door 92 may be defined by the panel assembly 921. The panel assembly 921 may have the same structure as the panel assembly 30 of the refrigerator 1 to emit light.

Thus, the panel assembly 921 may shine in a set color by the user setting, and a color of the outer appearance of the front surface of the cooking appliance 9 may be changed into the set color.

What is claimed is:

1. A refrigerator comprising:
    a cabinet defining a storage space; and
    a door including (i) a door body configured to open and close the storage space and (ii) a panel assembly detachably coupled to the door body,
    wherein the panel assembly includes:
        a panel defining a front surface of the door and configured to transmit light therethrough,
        a lighting device provided behind the panel and configured to emit light to the panel,
        a back cover defining a rear surface of the panel assembly and configured to cover a rear of the lighting device,
        a mounting member having a plate shape and configured to transmit light therethrough, wherein the mounting member is disposed between the panel and the lighting device and configured to support the lighting device, and
        a spacer provided between the mounting member and the lighting device and configured to separate the lighting device from the mounting member by a predetermined interval, and
    wherein the lighting device is configured to emit light toward the panel,
    wherein the lighting device includes:
        a substrate having a plate shape and disposed to be parallel with the panel, and
        a plurality of LEDs disposed on the substrate at equal intervals in vertical and horizontal directions and configured to emit light toward a front surface of the panel,
    wherein the spacer includes a plurality of through-holes defined at positions corresponding to the plurality of LEDs, the plurality of through-holes being configured to receive the plurality of LEDs therein,
    wherein the spacer further includes:
        a first support portion configured to be in contact with the substrate and extending perpendicularly to the substrate,
        an inclined portion inclined in a direction away from a center of a LED as it extends upward from an end portion of the first support portion, and a second support portion extending upward from an upper end of the inclined portion and configured to be in contact with the mounting member, and wherein an inner surface of a through-hole is defined by the first support portion, the inclined portion, and the second support portion.

2. The refrigerator of claim 1, wherein the spacer has a plate shape and is configured to transmit light therethrough, and wherein a front surface of the spacer is in contact with a rear surface of the mounting member, and a rear surface of the spacer is in contact with a front surface of the substrate.

3. The refrigerator of claim 1, wherein a thickness of the spacer is greater than a height of a LED protruding from the substrate.

4. The refrigerator of claim 1, wherein a size of a through-hole at a rear surface of the spacer is larger than a size of the LED, and wherein a size of the through-hole at a front surface of the spacer is larger than the size of the through-hole at the rear surface of the spacer.

5. The refrigerator of claim 1, wherein a through-hole is defined such that a circumference of the through-hole is located in an area outside an irradiation angle of a LED.

6. The refrigerator of claim 1, wherein a contact area between the first support portion and the substrate is larger than a contact area between the second support portion and the mounting member.

7. The refrigerator of claim 1, wherein the mounting member includes:

a front surface portion defining a front surface and configured to be in contact with the panel;

a side surface portion bent rearward from both left and right ends of the front surface portion; and a rear surface portion bent from the side surface portion toward a center of the mounting member, wherein an accommodation portion is defined by the front surface portion, the side surface portion, and the rear surface portion, and wherein the accommodation portion is configured to accommodate both ends of the substrate and the spacer.

8. The refrigerator of claim 1, wherein the spacer includes:

a spacer body having a plate shape and configured to be in contact with the substrate; and a transmission portion recessed in the spacer body and configured to accommodate an LED therein, and wherein the transmission portion is configured to transmit light from the LED therethrough.

9. The refrigerator of claim 8, wherein the transmission portion has a forward convex lens shape, and a protruding central portion of the transmission portion and a central portion of the LED are disposed on a same extension line.

10. The refrigerator of claim 1, wherein the spacer is made of a light-transmittable material and includes a recessed LED accommodation portion disposed at a position corresponding to a LED on a front surface of the substrate, the recessed LED accommodation portion configured to accommodate the LED.

11. The refrigerator of claim 10, wherein the spacer further includes:

an edge portion (i) having open front and back surfaces and (ii) defining the LED accommodation portion therein; and a transmission portion covering the open front surface of the edge portion, and wherein the transmission portion has a lens shape with a central portion that protrudes toward the panel.

12. The refrigerator of claim 10, wherein the substrate is coupled to the spacer, and wherein both left and right ends of the substrate are fixed by the mounting member, and a protruding end portion of the spacer is in contact with a front surface portion of the mounting member.

13. The refrigerator of claim 1, wherein the lighting device further includes:

a base having a plate shape parallel to a rear surface of the panel and comprising at least one film layer, and wherein the plurality of LEDs are disposed on the base at equal intervals.

14. The refrigerator of claim 13, wherein the base includes:

a first layer in which the plurality of LEDs are disposed; and a second layer disposed at a front surface of the first layer and configured to cover the plurality of LEDs, and wherein the second layer is made of a light-transmittable material.

15. The refrigerator of claim 1, wherein the back cover is made of a metal material, and wherein an insulator configured to cover the lighting device is provided between the back cover and the lighting device.

* * * * *